United States Patent
Nagasaka

(10) Patent No.: US 12,556,629 B2
(45) Date of Patent: Feb. 17, 2026

(54) INFORMATION PROCESSING APPARATUS, INFORMATION PROCESSING METHOD, OUTPUTTING APPARATUS, OUTPUTTING METHOD, AND NOTIFICATION SYSTEM

(71) Applicant: SONY GROUP CORPORATION, Tokyo (JP)

(72) Inventor: Hideo Nagasaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 341 days.

(21) Appl. No.: 17/996,595

(22) PCT Filed: Apr. 14, 2021

(86) PCT No.: PCT/JP2021/015461
§ 371 (c)(1),
(2) Date: Oct. 19, 2022

(87) PCT Pub. No.: WO2021/220812
PCT Pub. Date: Nov. 4, 2021

(65) Prior Publication Data
US 2023/0254401 A1 Aug. 10, 2023

(30) Foreign Application Priority Data
Apr. 27, 2020 (JP) .................. 2020-078675

(51) Int. Cl.
*H04M 1/72454* (2021.01)
*H04M 1/72409* (2021.01)
*H04M 11/02* (2006.01)

(52) U.S. Cl.
CPC ... *H04M 1/72454* (2021.01); *H04M 1/72409* (2021.01); *H04M 11/02* (2013.01)

(58) Field of Classification Search
CPC ......... H04M 1/72454; H04M 1/72409; H04M 1/6066; H04M 11/02; G06F 3/167;
(Continued)

(56) References Cited

U.S. PATENT DOCUMENTS

2009/0018899 A1  1/2009  Ogushi
2013/0218553 A1  8/2013  Fujii
(Continued)

FOREIGN PATENT DOCUMENTS

CN    106231072 A  * 12/2016  ........ H04M 1/72522
JP    2003122676 A   4/2003
(Continued)

OTHER PUBLICATIONS

Tatsuhito Uchida, et al: "Proposal of Informal message notification method matched to user's timing", the Information Processing Society of Japan report of research, Japan, Information Processing Society of Japan, Mar. 21, 2008, the 2008th volume, No. 31, and the 133-138th.

(Continued)

*Primary Examiner* — Farid Seyedvosoghi
(74) *Attorney, Agent, or Firm* — CHIP LAW GROUP

(57) ABSTRACT

Provided is an information processing apparatus, an information processing method, an outputting apparatus, an outputting method, a program, and a notification system that make it possible to output a notification by sound of the appropriate contents at an appropriate timing. An information processing apparatus controls, according to a state of a user, the state being decided on the basis of multiple types of detection results relating to a situation of the user, and an importance level set to each of notifications to the user, outputting of the notifications by sound.

17 Claims, 21 Drawing Sheets

(58) Field of Classification Search
CPC ......... G08B 3/10; G10L 25/78; H04R 1/1091; H04R 2460/07
See application file for complete search history.

(56) References Cited

U.S. PATENT DOCUMENTS

| | | | |
|---|---|---|---|
| 2018/0026920 A1 | 1/2018 | Chen | |
| 2018/0063283 A1* | 3/2018 | Mochizuki | H04L 67/62 |
| 2018/0107445 A1 | 4/2018 | Ohmura | |
| 2020/0406139 A1* | 12/2020 | Chino | A63F 13/355 |

FOREIGN PATENT DOCUMENTS

| | | | | |
|---|---|---|---|---|
| JP | 2005-292730 A | | 10/2005 | |
| JP | 2008299528 A | | 12/2008 | |
| JP | 2009-020672 A | | 1/2009 | |
| JP | 2011237217 A | | 11/2011 | |
| JP | 2012194060 A | | 10/2012 | |
| JP | 2013-073378 A | | 4/2013 | |
| JP | 2014123192 A | * | 7/2014 | |
| JP | 2014123826 A | | 7/2014 | |
| JP | 2015126477 A | | 7/2015 | |
| JP | 2015-169472 A | | 9/2015 | |
| JP | 2017069687 A | | 4/2017 | |
| JP | 2019197565 A | | 11/2019 | |
| JP | 2020530671 A | | 10/2020 | |
| WO | 2016/157993 A1 | | 10/2016 | |

OTHER PUBLICATIONS

International Search Report and Written Opinion of PCT Application No. PCT/JP2021/015461, issued on Jul. 6, 2021, 09 pages of ISRWO.

* cited by examiner

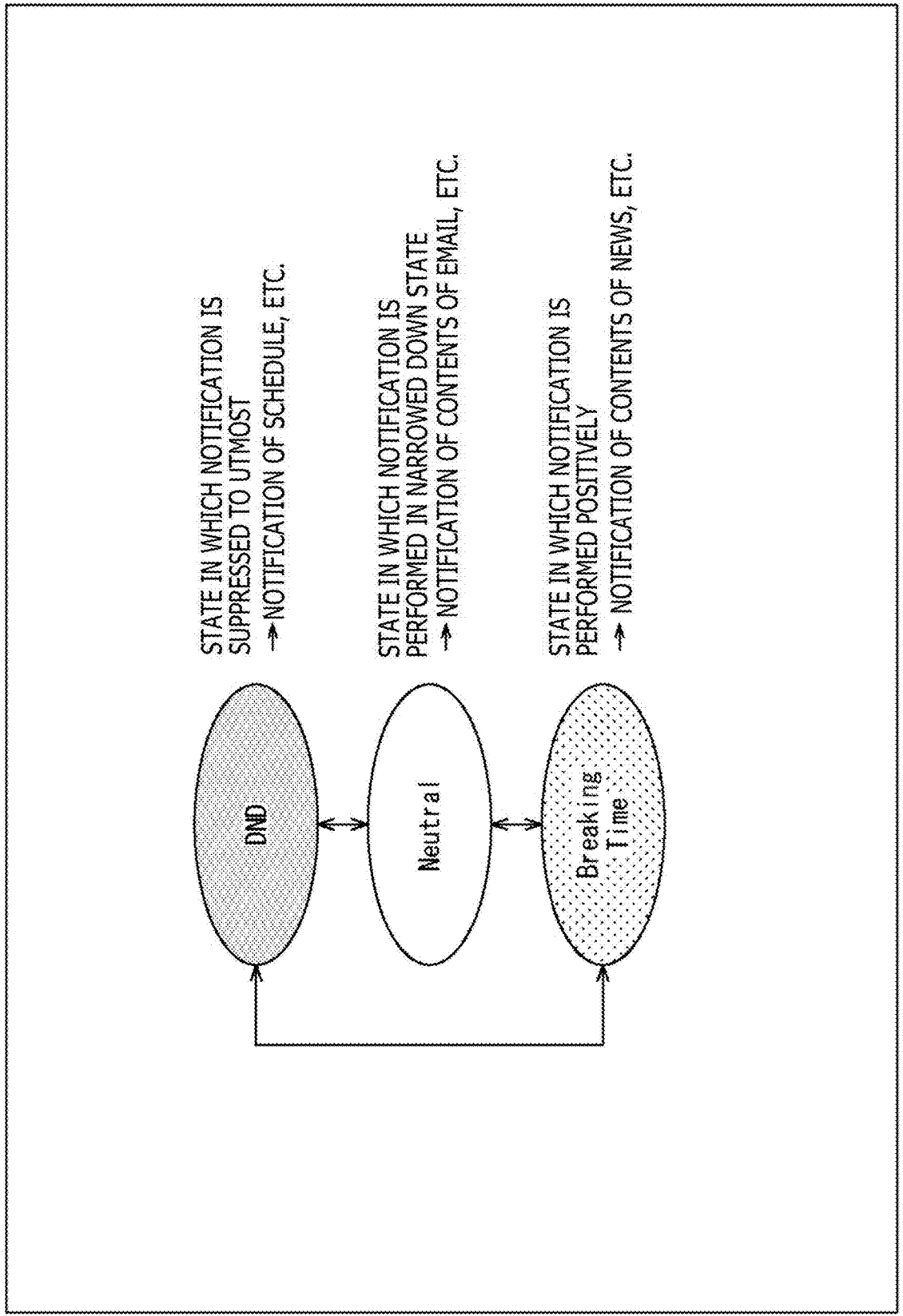

FIG. 6

| DND SETTING | CONVERSATION STATE | MOVEMENT STATE | APPLICATION OPERATION | LOCATION | DECISION RESULTS OF COMPREHENSIVE Contexts | |
|---|---|---|---|---|---|---|
| | CONVERSATION PRESENT | WALKING | | | DND | t0 |
| | | | NONE | WORKPLACE | Neutral | t1 |
| | | ELEVATOR | | | Breaking Time | t2 |
| | | WALKING | | | | t3 |
| | | WALKING | | | Neutral | |
| SETTING OF DND | CONVERSATION ABSENT | | | AWAY FROM HOME | | t4 |
| | | TRAIN | WATCHING MOVING IMAGE | | Breaking Time | t5 |
| | | | | | DND | |
| | | WALKING | NONE | | | t6 |
| | | | | | Breaking Time | t7 |
| | | SITTING | | HOME | Neutral | t8 |
| | CONVERSATION PRESENT | | | | DND | t9 |

FIG. 7

| | DND | Neutral | Breaking Time |
|---|---|---|---|
| IMPORTANCE LEVEL 1 | ○ | ○ | ○ |
| IMPORTANCE LEVEL 2 | × | ○ | ○ |
| IMPORTANCE LEVEL 3 | × | × | ○ |

FIG. 8

| SUCCEEDING NOTIFICATION | NOTIFICATION BEING OUTPUTTED | | |
|---|---|---|---|
| | IMPORTANCE LEVEL 1 | IMPORTANCE LEVEL 2 | IMPORTANCE LEVEL 3 |
| IMPORTANCE LEVEL 1 | ○ | ○ | ○ |
| IMPORTANCE LEVEL 2 | × | ○ | ○ |
| IMPORTANCE LEVEL 3 | × | × | ○ |

FIG. 9

PROCESSING PATTERNS OF NOTIFICATION

1. PATTERN IN WHICH NOTIFICATION IS OUTPUTTED IMMEDIATELY IN RESPONSE TO NOTIFICATION REGISTRATION FROM APPLICATION

2. PATTERN IN WHICH NOTIFICATION IS STORED (Stack)

3. PATTEN IN WHICH STORED NOTIFICATION IS OUTPUTTED AT TIMING OF Breaking Point

FIG. 10

| IMPORTANCE LEVEL OF Stacked NOTIFICATION | Breaking Point | |
|---|---|---|
| | DND → Neutral | DND → Breaking Time<br>Neutral → Breaking Time |
| 2 | ○ | ○ |
| 3 | × | ○ |

FIG. 11

| | DECISION RESULTS OF COMPREHENSIVE Contexts | NOTIFICATION OF IMPORTANCE LEVEL 1 | NOTIFICATION OF IMPORTANCE LEVEL 2 | NOTIFICATION OF IMPORTANCE LEVEL 3 | |
|---|---|---|---|---|---|
| t0 | DND | Go | Stack | Stack | |
| t1 | Neutral | Go | Go | Stack | ← Breaking Point |
| t2 | Breaking Time | Go | Go | Go | ← Breaking Point |
| t3 | Neutral | Go | Go | Stack | |
| t4 | Breaking Time | Go | Go | Go | ← Breaking Point |
| t5 | DND | Go | Stack | Stack | |
| t6 | Breaking Time | Go | Go | Go | ← Breaking Point |
| t7 | Neutral | Go | Go | Stack | |
| t8 | DND | Go | Stack | Stack | |
| t9 | | | | | |

# INFORMATION PROCESSING APPARATUS, INFORMATION PROCESSING METHOD, OUTPUTTING APPARATUS, OUTPUTTING METHOD, AND NOTIFICATION SYSTEM

CROSS REFERENCE TO RELATED APPLICATIONS

This application is a U.S. National Phase of International Patent Application No. PCT/JP2021/015461 filed on Apr. 14, 2021, which claims priority benefit of Japanese Patent Application No. JP 2020-078675 filed in the Japan Patent Office on Apr. 27, 2020. Each of the above-referenced applications is hereby incorporated herein by reference in its entirety.

TECHNICAL FIELD

The present technology relates particularly to an information processing apparatus, an information processing method, an outputting apparatus, an outputting method, a program, and a notification system that make it possible to output a notification by sound of the appropriate contents at an appropriate timing.

BACKGROUND ART

In such a device as a smartphone, various notifications from an application installed therein are performed in a push-like manner. The user can confirm the contents of a notification from the application on the screen of the smartphone without performing an operation for receiving the notification.

There are needs to accept necessary information simply when needed.

PTL 1 discloses a technology of analyzing environments from a walking motion, a position, a schedule, and so forth and reproducing content. PTL 2 discloses a technology that recommends content on the basis of a life pattern.

CITATION LIST

Patent Literature

[PTL 1]
Japanese Patent Laid-Open No. 2005-292730
[PTL 2]
Japanese Patent Laid-Open No. 2013-073378

SUMMARY

Technical Problem

With the spread of an earphone of the fully independent type (inner ear headphone) and so forth, the period of time during which an earphone is worn is increasing. Therefore, it is estimated that it becomes further common that notification of an application is performed not on the screen but with use of sound outputted from an earphone.

In a case where notification is performed by sound, time is required for each notification by a period of time for reproduction of sound. Therefore, in the case of performing notification by sound, it is more important to provide a necessary notification when needed than that in a case where a notification is displayed on the screen.

The present technology has been made in view of such a situation as described above and makes it possible to output a notification by sound of the appropriate contents at an appropriate timing.

Solution to Problem

An information processing apparatus of a first aspect of the present technology includes a control section that controls, according to a state of a user, the state being decided on the basis of multiple types of detection results relating to a situation of the user, and an importance level set to each of notifications to the user, outputting of the notifications by sound.

An outputting apparatus of a second aspect of the present technology includes an output controlling section that outputs notifications by sound, under control of an information processing apparatus that controls, according to a state of a user, the state being decided on the basis of multiple types of detection results relating to a situation of the user, and an importance level set to each of the notifications to the user, outputting of the notifications.

A notification system of a third aspect of the present technology includes an information processing apparatus that controls, according to a state of a user, the state being decided on the basis of multiple types of detection results relating to a situation of the user, and an importance level set to each of notifications to the user, outputting of the notifications by sound, and an outputting apparatus that is used by the user and outputs a corresponding one of the notifications by sound under control of the information processing apparatus.

In the present technology, outputting of a notification by sound is performed according to a state of a user, the state being decided on the basis of multiple detection results relating to a situation of the user, and an importance level set to each of notifications to the user.

BRIEF DESCRIPTION OF DRAWINGS

FIG. 5 is a diagram illustrating an example of a relation between Contexts and notifications.
FIG. 6 is a diagram illustrating examples of decision results of comprehensive Contexts.
FIG. 7 is a diagram illustrating an example of outputting for each importance level.
FIG. 8 is a diagram illustrating examples of control of interrupt of a notification.
FIG. 9 is a view illustrating an example of a pattern of processing of a notification.
FIG. 10 is a diagram illustrating an example of a Breaking Point.
FIG. 11 is a diagram illustrating examples of outputting of a notification.

DESCRIPTION OF EMBODIMENT

In the following, a mode for carrying out the present technology is described. The description is given in the following order.

1. Configuration of Notification System
2. Decision of State of User
3. Importance Level of Notification
4. Stack of Notifications
5. Configuration of Individual Apparatuses
6. Operation of Notification Controlling Server
7. Modifications <Configuration of Notification System>

Figure 1:
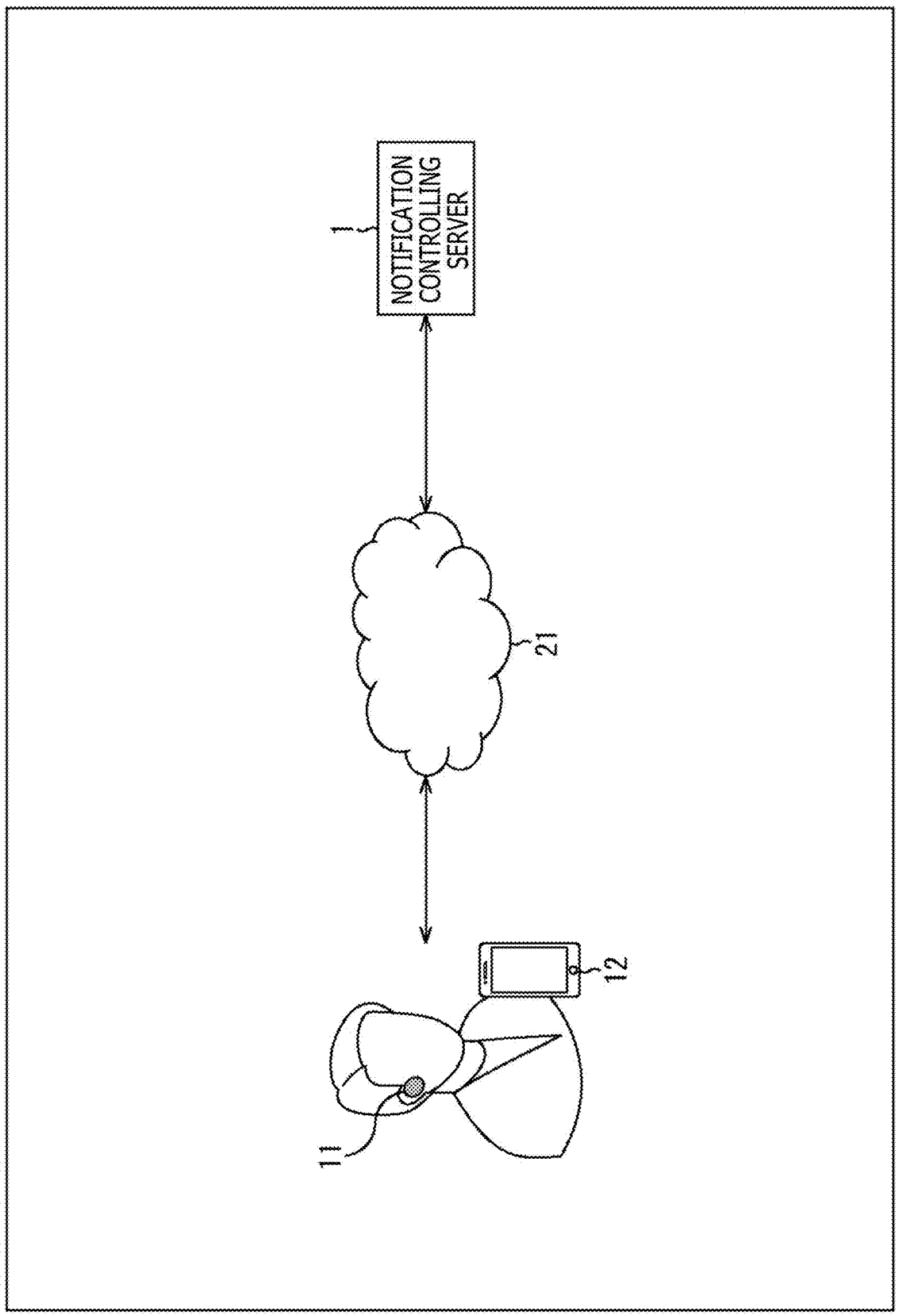
FIG. 1 is a diagram illustrating an example of a configuration of a notification system according to an embodiment of the present technology.

FIG. 1 is a diagram illustrating an example of a configuration of a notification system according to an embodiment of the present invention.

The notification system of FIG. 1 includes a notification controlling server 1, and an earphone (inner ear headphone) 11 and a portable terminal 12 as components of the user side. In the example in FIG. 1, the earphone 11 is an earphone of what is generally called the fully independent type.

The earphone 11 and the portable terminal 12 are connected to the notification controlling server 1 through a network 21 that includes the Internet or the like. Otherwise, the earphone 11 may be connected directly to the network 21 or may be connected to the network 21 through the portable terminal 12. The earphone 11 and the portable terminal 12 are connected to each other by wireless communication such as Bluetooth (registered trademark), a wireless LAN (Local Area Network), or communication of the cellular type (LTE-Advanced, 5G, or the like). The earphone 11 and the portable terminal 12 may be connected to each other otherwise by a wire cable.

Figure 2:
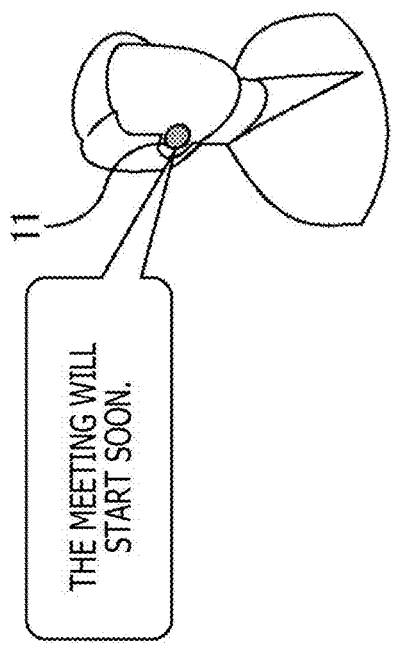
FIG. 2 is a view illustrating an example of a notification to a user.

The notification controlling server 1 is an information processing apparatus that controls outputting of a notification to a user who wears the earphone 11. Notification to the user is performed by sound outputted from the earphone 11 as illustrated in a balloon in FIG. 2 under the control of the notification controlling server 1. In the example in FIG. 2, notification of a schedule that has been registered by the user is performed.

Various kinds of notification such as notification of an application used by the user, notification of a service, and notification of an advertisement are performed by sound without depending upon an operation of the user.

Applications (application programs) used by the user include various kinds of applications such as a mailer, a schedule management application, a contact management application, a document creation application and an OS (Operating System). The applications may be what are generally called native applications installed in the portable terminal 12 or may be Web applications executed on a server on the network 21.

By living in a state in which the user normally wears the earphone 11, the user can accept various notifications related to the user by what is generally called a SUI (Sound User Interface), without operating the portable terminal 12 or the like and looking at the screen.

Control of notification by the notification controlling server 1 is performed by delivering information regarding the contents appropriate to the user at a timing appropriate to the user on the basis of the state of the user. In the notification controlling server 1, the state of the user is decided on the basis of detection results of various sensors and so forth. The sensors include an acceleration sensor, a gyro sensor, a GPS sensor, and so forth.

<Decision of State of User>

Figure 3:
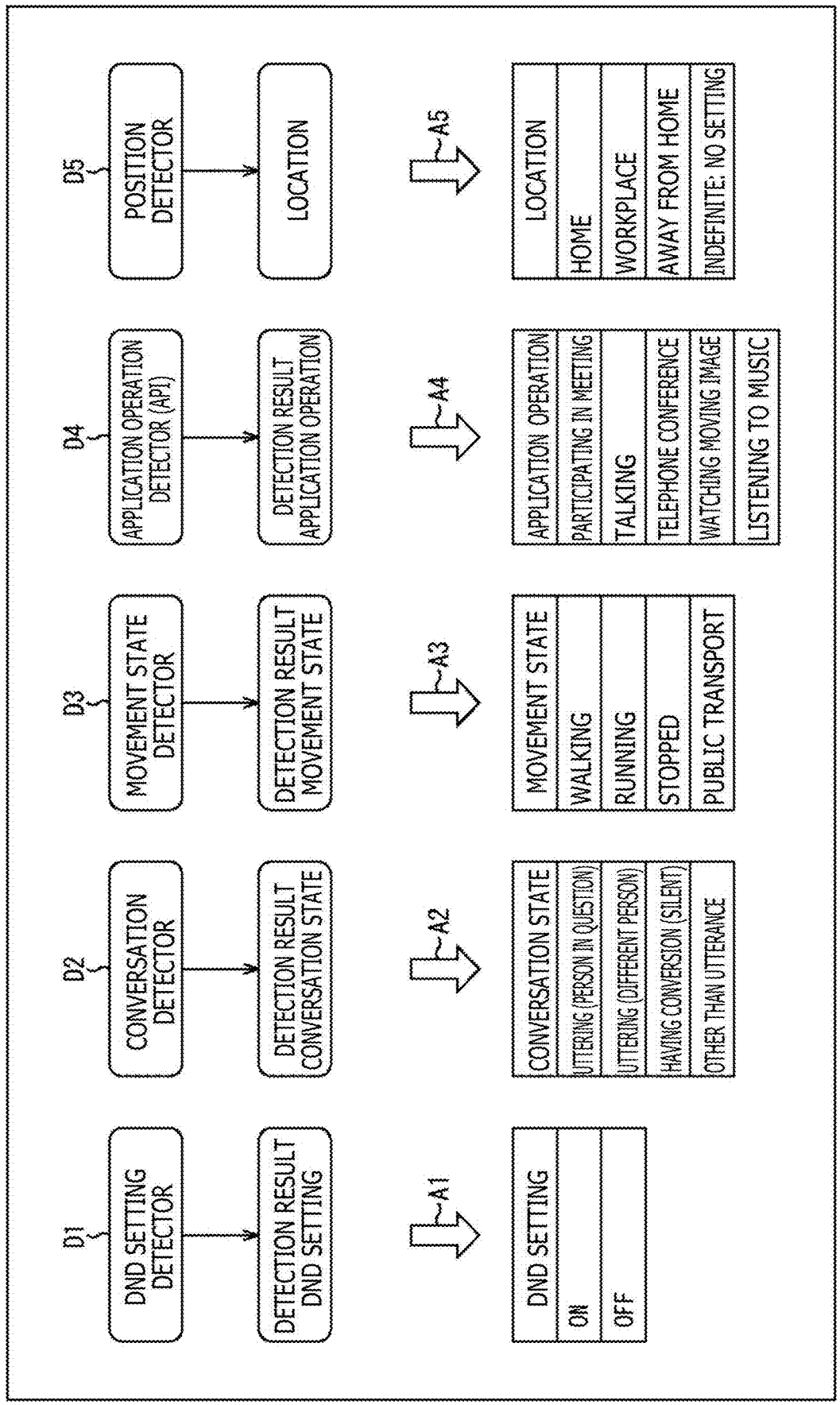
FIG. 3 is a diagram illustrating an example of information used for decision of a state of a user.

FIG. 3 is a diagram illustrating examples of information used for decision of a state of a user.

As illustrated in FIG. 3, detection results by a DND setting detector D1, a conversation detector D2, a movement state detector D3, an application operation detector D4, and a position detector D5 are used for decision of a state of a user.

The DND setting detector D1 detects a state of setting of DND (Do Not Disturb). The setting of the DND is setting of ON/OFF of a function for deciding a state of a user as DND described later. In a case where the setting of the DND is, for example, ON, it is permitted to decide the state of the user as the DND. A detection result of the DND setting detector D1 is ON/OFF of the setting of the DND as indicated by an arrow mark A1.

The conversation detector D2 detects a state of conversation of the user. The conversation detected by the conversation detector D2 includes not only conversation that is being performed Face To Face by the user but also conversation performed using an application of the portable terminal 12 such as a telephone call application. A detection result of the conversation detector D2 includes an utterance by the user him- or herself, an utterance by a different person, silence, other than utterance, and so forth as indicated by an arrow mark A2.

The movement state detector D3 detects a state of movement of the user. A detection result of the movement state detector D3 includes walking, running, or stopped, or movement by a public transport and so forth as indicated by an arrow mark A3.

The application operation detector D4 detects a state of operation of an application (App) used by the user. The application operation detector D4 is implemented by a Web API that performs transmission and reception of information to and from a server that executes the application. A detection result of the application operation detector D4 includes participating in meeting, talking, telephone conference, watching moving image, listening to music, and so forth as indicated by an arrow mark A4.

The position detector D5 detects a location of the user. A detection result of the position detector D5 includes home, workplace, away from home, indefinite (no setting), and so forth as indicated by an arrow mark A5.

As described above, multiple types of detection results relating to a situation of the user are found by the conversation detector D2, the movement state detector D3, the application operation detector D4, and the position detector D5.

The detectors illustrated in FIG. 3 are implemented in various apparatuses such as the notification controlling server 1, the earphone 11, and the portable terminal 12. Each of the detectors detects its target on the basis of sensor data measured by a sensor provided on a device such as the earphone 11 or the portable terminal 12 or on the basis of information transmitted from a server on the network 21.

A detector that detects a target other than the targets illustrated in FIG. 3 may be provided such that a detection result by the detector is used for decision of a state of the user.

Figure 4:
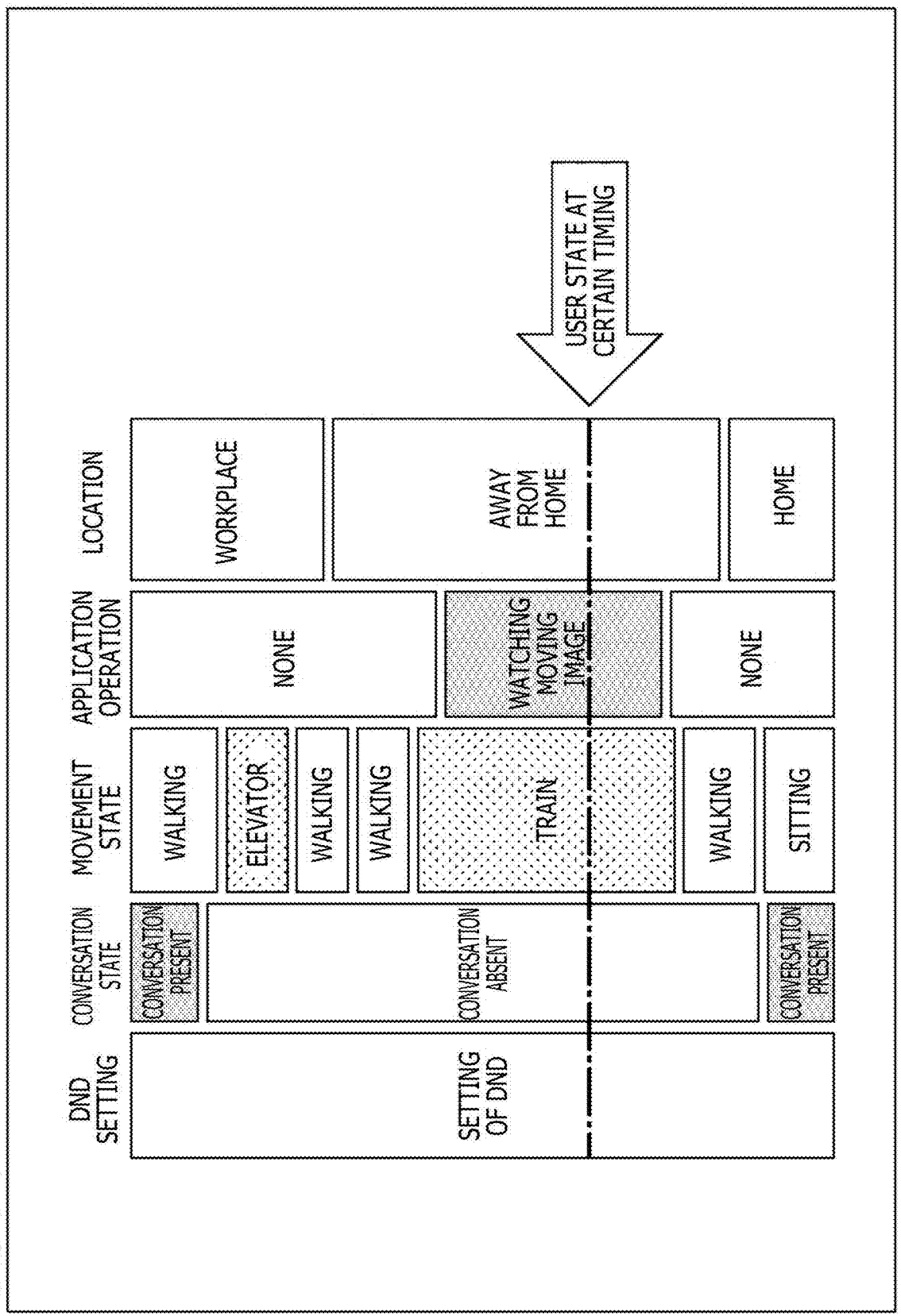
FIG. 4 is a diagram illustrating examples of change of detection results.

FIG. 4 is a view illustrating examples of change of detection results.

With reference to FIG. 4, the vertical direction indicates a time direction. Individual columns represent detection results of the detectors of FIG. 3. For example, it is indicated that the detection result of the state of conversation by the conversation detector D2 changes from a state of "conversation present" to another state of "conversation absent" at a certain timing and then changes, after the state of "conversation absent" continues for a predetermined period of time, back to the state of "conversation present."

On the basis of the detection results, it is decided which one of three types of states set in advance the state of the user is. Meanwhile, as indicated by a dash-dot chain line, the state of the user at a certain timing is decided comprehensively by combining the states decided using the detection results of the detectors.

FIG. 5 is a diagram illustrating an example of a relation between Contexts and notifications.

As Contexts that are states of a user, three states of "DND," "Neutral," and "Breaking Time" are set.

The "DND" is a state in which notification is suppressed to the utmost. When the Context is the DND, only a notification that is considered especially important, such as a notification of a schedule, is outputted.

The "Neutral" is a state in which notification is performed in a narrowed down condition. When the Context is the Neutral, a notification of the contents of an email or the like is outputted.

The "Breaking Time" is a state in which notification is performed positively. When the Context is the Breaking Time, a notification of the contents of news or the like is outputted.

As described above, the "DND," "Neutral," and "Breaking Time" represent states corresponding to levels of ease of receiving a notification to the user. Four or more states may be set as states corresponding to levels of ease of receiving a notification.

On the basis of detection results of the detectors, it is decided which one of the states of "DND," "Neutral," and "Breaking Time" the Context is. From among blocks representative of the detection results described hereinabove with reference to FIG. 4, blocks each indicated with a color applied thereto represent detection results decided as the DND, and blocks each indicated with a hatching represent detection results decided as the Breaking Time. Any other block (block without any of a color and a hatching) represents a detection result decided as the Neutral. Such representations apply similarly to diagrams that are referred to in the following description.

At the timing indicated by the dash-dot chain line in FIG. 4, the Context is decided to be the Breaking Time on the basis of "train" that is a detection result of the movement state, and the Context is decided to be the DND on the basis of "watching moving image" that is a detection result of the application operation. The Context is decided to be the Neutral on the basis of the other detection results. By combining the decision results of the Context based on such detection results as described above, a Context representative of a comprehensive state of the user is decided.

In the following description, the Contexts decided on the basis of the respective detection results are suitably referred to as individual Contexts, and the Context decided comprehensively by combining decision results of the individual Contexts is referred to as comprehensive Context.

FIG. 6 is a diagram illustrating examples of the decision results of the comprehensive Contexts.

The decision results illustrated in FIG. 6 are individually same as the detection results described hereinabove with reference to FIG. 4. The individual Context in each time zone is decided in the following matters on the basis of the detection results.

Individual Context Based on Detection Result of DND Setting
    Time t0 to time t9: Neutral Individual Contexts Based on Detection Results of Conversation States
    Time t0 to time t1: DND because detection result is "conversation present"
    Time t1 to time t8: Neutral because detection result is "conversation absent"
    Time t8 to time t9: DND because detection result is "conversation present"

Individual Contexts Based on Detection Results of Movement States
    Time t0 to time t2: Neutral because detection result is "walking"
    Time t2 to time t3: Breaking Time because detection result is "elevator"
    Time t3 to time t4: Neutral because detection result is "walking"
    Time t4 to time t7: Breaking Time because detection result is "train"
    Time t7 to time t9: Neutral because detection results are "walking" and "sitting"

Individual Contexts Based on Detection Results of Application Operation
    Time t0 to time t5: Neutral
    Time t5 to time t6: DND because detection result is "watching moving image"
    Time t6 to time t9: Neutral Individual Context Based on Detection Result of Location
    Time t0 to time t9: Neutral In a case where such decision results of the individual Contexts as described above are obtained, the comprehensive Context during each period of time is decided as indicated at the right end in FIG. 6.

Time t0 to Time t1: DND
    Since the individual Contexts based on the detection result of the conversation state are decided as DND, the comprehensive Context is decided as DND.

Time t1 to Time t2: Neutral
    Since all individual Contexts are decided as Neutral, the comprehensive Context is decided as Neutral.

Time t2 to Time t3: Breaking Time
    Since the individual Contexts based on the detection results of the movement state are decided as Breaking Time and the other individual Contexts are decided as Neutral, the comprehensive Context is decided as Breaking Time.

Time t3 to Time t4: Neutral

Since all individual Contexts are decided as Neutral, the comprehensive Context is decided as Neutral.

Time t4 to Time t5: Breaking Time

Since the individual Contexts based on the detection results of the movement state are decided as Breaking Time and the other individual Contexts are decided as Neutral, the comprehensive Context is decided as Breaking Time.

Time t5 to Time t6: DND

Since the individual Context based on the detection result of the application operation is decided as DND, the comprehensive Context is decided as DND.

Time t6 to Time t7: Breaking Time

Since the individual Context based on the detection result of the movement state is decided as Breaking Time and the other individual Contexts are decided as Neutral, the comprehensive Context is decided as Breaking Time.

Time t7 to Time t8: Neutral

Since all individual Contexts are decided as Neutral, the comprehensive Context is decided as Neutral.

Time t8 to Time t9: DND

Since the individual Context based on the detection result of the conversation state is decided as DND, the comprehensive Context is decided as DND.

As described above, the comprehensive Context during a period of time that includes an individual Context decided as DND is decided as DND.

Meanwhile, the comprehensive Context during any period of time that includes an individual Context decided as Breaking Time from among periods of time that do not include an individual Context decided as DND is decided as Breaking Time.

The comprehensive Context during any period of time that includes none of an individual Context decided as DND and an individual Context decided as Breaking Time is decided as Neutral.

In the notification controlling server 1, the state of the user is decided in such a manner as described above and is used for control of outputting of a notification. It is to be noted that it may be learned whether the comprehensive Context is decided as DND or the like in what state the individual Contexts are and the comprehensive Context may change.

<Importance Level of Notification>

The notification controlling server 1 decides an importance level of each notification and controls outputting of the notification on the basis also of the decided importance level.

FIG. 7 is a view illustrating an example of outputting for each importance level.

As illustrated in FIG. 7, to each notification, an importance level from among three importance levels including an importance level 1, an importance level 2, and an importance level 3 is set.

A notification of the importance level 1 is a notification that is supposed to be essential to the user and missing of which is supposed to bring some disadvantage to the user. Notifications of disaster information, an incoming call, an alarm of a meeting, and so forth are notifications of the importance level 1.

A notification of the importance level 2 is a notification supposed to be beneficial to the user. Notifications of the contents of an email, a summary of a today's schedule, and so forth are notifications of the importance level 2.

A notification of the importance level 3 is a notification supposed to be desirable to the user. Notifications of a recommendation such as a notice of release of a new song and so forth are notifications of the importance level 3.

Permissibility of a notification is determined according to the importance level and the comprehensive Context of the notification. With reference to FIG. 7, a circle mark indicated in any field represents that outputting of the notification is permissible, and a cross mark represents that outputting of the notification is impermissible. FIG. 7 represents a relation between the states of the comprehensive Contexts and the importance levels of notifications that are permissible to output in the states of the comprehensive Contexts.

In a case where the comprehensive Context is the DND, outputting of a notification of the importance level 1 is decided to be permissible, and outputting of a notification of the importance level 2 and outputting of a notification of the importance level 3 are impermissible.

In a case where the comprehensive Context is the Neutral, outputting of a notification of the importance level 1 and a notification of the importance level 2 are decided to be permissible, and outputting of a notification of the importance level 3 is impermissible.

In a case where the comprehensive Context is the Breaking Time, outputting of all notifications is decided to be permissible.

For example, during the period of time from time t0 to time t1 of FIG. 6 during which it is decided that the comprehensive Context is DND because the conversation state is "conversation present," only a notification of disaster information or the like that is essential to the user is outputted.

FIG. 8 is a view illustrating examples of control of interrupt of a notification.

Into the notification controlling server 1, registration of various notifications of various applications used by the user is performed sequentially. Information relating to notification registration is transmitted from various applications to the notification controlling server 1. The notification controlling server 1 receives the information transmitted thereto to thereby accept the notification registration of the applications and controls outputting of the notifications.

For example, prepared is a function for interrupt-outputting for allowing, in a case where notification registration of a different notification is performed while a certain notification is being outputted, outputting of the succeeding notification whose notification registration is performed, in such a form that the succeeding notification interrupts the preceding notification that is being outputted. Outputting of the preceding notification is suspended, and the succeeding notification is outputted in priority. Whether or not interrupt-outputting is to be permissible is decided on the basis of the importance levels of the preceding notification and the succeeding notification.

As indicated in the third row from above in FIG. 8, in a case where the importance level of the succeeding notification is the importance level 1, interrupt-outputting is decided to be permissible whichever one of the importance level 1, importance level 2, and importance level 3 the importance level of the preceding notification that is being outputted is.

In a case where the importance level of the succeeding notification is the importance level 2, when the preceding notification that is being outputted is a notification of the importance level 2 or the importance level 3, interrupt-outputting is decided to be permissible. When the preceding notification that is being outputted is a notification of the importance level 1, interrupt-outputting is decided to be impermissible.

In a case where the importance level of the succeeding notification is the importance level 3, when the preceding notification that is being outputted is a notification of the importance level 3, interrupt-outputting is decided to be permissible. When the preceding notification that is being outputted is a notification of the importance level 1 or the importance level 2, interrupt-outputting is decided to be impermissible.

Although, in the examples in FIG. 8, interrupt-outputting is decided to be permissible in a case where the importance level of the preceding notification and the importance level of the succeeding notification are the same, it may otherwise be decided to be impermissible.

<Stack of Notifications>

FIG. 9 is a view illustrating an example of patterns of processing of a notification.

The pattern 1 is a pattern in which, in response to notification registration from an application, the notification is outputted immediately (outputted on the real time basis without being Stacked). For example, in a case where notification registration of a notification of the importance level 1 is performed, the notification is outputted immediately according to the pattern 1.

The pattern 2 is a pattern in which a notification is stored (Stacked) in response to notification registration from an application. For example, in a case where the comprehensive Context is the DND and notification registration of a notification of the importance level 2 or the importance level 3 is performed, the notification is stored according to the pattern 2. In particular, a notification that is not outputted immediately according to the pattern 1 when notification registration is performed is stored. Since a notification of the importance level 1 is outputted immediately, a notification of the importance level 2 and a notification of the importance level 3 become targets of Stacking.

The pattern 3 is a pattern in which a notification stored is outputted at a timing of a Breaking Point. In a case where it is a Breaking Point, a notification or notifications having been Stacked till then are outputted according to the pattern 3. The Breaking Point represents a timing at which the comprehensive Context changes to a state suitable for outputting of the notification.

FIG. 10 is a table illustrating examples of the Breaking Points.

Three different timings including a timing at which the comprehensive Context changes from the DND to the Neutral, another timing at which the comprehensive Context changes from the DND to the Breaking Time, and still another timing at which the comprehensive Context changes from the Neutral to the Breaking Timing are defined as Breaking Points.

At the Breaking Point at which the comprehensive Context changes from the DND to the Neutral, a notification or notifications of the importance level 2 from among notifications Stacked till then are outputted. A notification of the importance level 3 is not outputted.

At the Breaking Point at which the comprehensive Context changes from the DND to the Breaking Point and the Breaking Point at which the comprehensive Context changes from the Neutral to the Breaking Point, a notification of the importance level 2 and a notification of the importance level 3 having been stacked are outputted.

FIG. 11 is a diagram illustrating examples of outputting of a notification.

Decision results of the comprehensive Contexts indicated at the left end in FIG. 11 are the same as the decision results described hereinabove with reference to FIG. 6. Timings of time t1 at which the comprehensive Context changes from the DND to the Neutral, time t2 and time t4 at which the comprehensive Context changes from the Neutral to the Breaking Time, and time t6 at which the comprehensive Context changes from the DND to the Breaking Point are each a Breaking Point.

A notification of the importance level 1 is outputted immediately (in FIG. 11, "Go") irrespective of the decision result of the comprehensive Context.

A notification of the importance level 2 is Stacked in a case where notification registration is performed within the period of time from time t0 to time t1 during which the comprehensive Context is the DND, and is outputted at a timing of the Breaking Point at time t1.

Further, a notification of the importance level 2 is Stacked in a case where notification registration is performed within the period of time from time t5 to time t6 during which the comprehensive Context is the DND, and is outputted at a timing of the Breaking Point at time t6. A notification of the importance level 2 is Stacked also in a case where notification registration is performed within the period of time from time t8 to time t9 during which the comprehensive Context is the DND.

A notification of the importance level 3 is Stacked in a case where notification registration is performed within the period of time from time t0 to time t1 during which the comprehensive Context is the DND and within the period of time from time t1 to time t2 during which the comprehensive Context is the Neutral, and is outputted at a timing of the Breaking Point at time t2.

Further, a notification of the importance level 3 is Stacked in a case where notification registration is performed within the period of time from time t3 to time t4 during which the comprehensive Context is the Neutral, and is outputted at a timing of the Breaking point at time t4.

A notification of the importance level 3 is Stacked in a case where notification registration is performed within the period of time from time t5 to time t6 during which the comprehensive Context is the DND, and is outputted at a timing of the Breaking Point at time t6. A notification of the importance level 3 is Stacked also in a case where notification registration is performed within the period of time from time t7 to time t8 during which the comprehensive Context is the Neutral and the period of time from time t8 to time t9 during which the comprehensive Context is the DND.

As described above, the notification controlling server 1 controls outputting of a notification according to a comprehensive Context representative of a state of the user and an importance level of a notification. This makes it possible for the notification controlling server 1 to output a notification of an appropriate importance level at a timing appropriate to the user.

A deadline for a notification may be made settable. A deadline for each notification is set by a transmission source that performs notification registration (registration source of the notification). From among Stacked notifications, a notification whose deadline has passed is discarded.

A notification for which no deadline is set may be discarded without being Stacked, or a predetermined period of time such as 24 hours may be set as a deadline. The deadline may be made different for each importance level.

From among notifications whose transmission sources are the same, only the latest notification may be Stacked while notifications preceding the latest notification may be discarded. In this case, every time notification registration is performed, the Stacked notification is updated.

<Configuration of Individual Apparatuses>
Configuration of Notification Controlling Server 1

Figure 12:
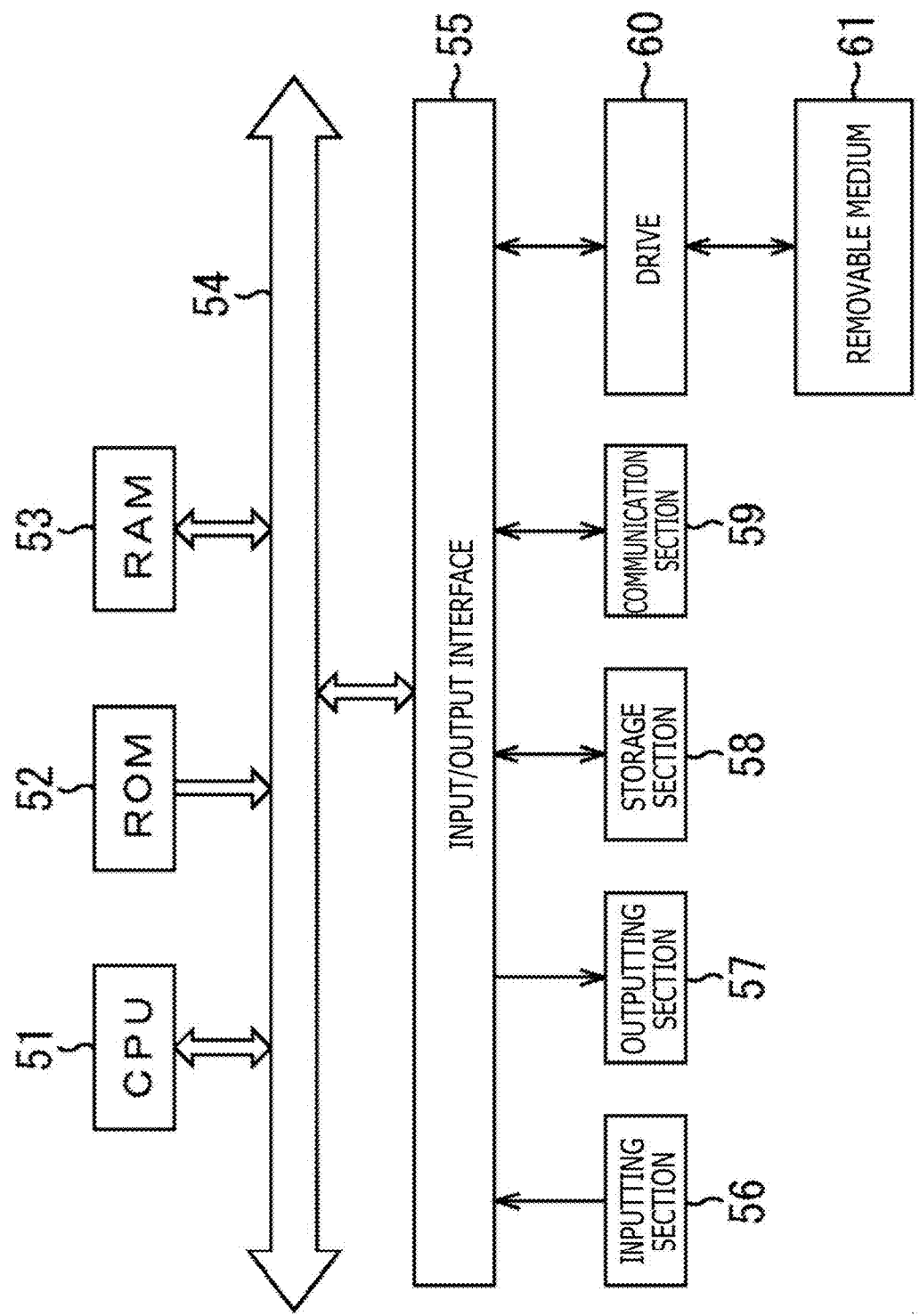
FIG. 12 is a block diagram illustrating an example of a hardware configuration of a computer that configures a notification controlling server.

FIG. 12 is a block diagram illustrating an example of a hardware configuration of a computer that configures the notification controlling server 1.

A CPU (Central Processing Unit) 51, a ROM (Read Only Memory) 52, and a RAM (Random Access Memory) 53 are connected to each other by a bus 54.

An input/output interface 55 is further connected to the bus 54. To the input/output interface 55, an inputting section 56 that includes a keyboard, a mouse, or the like and an outputting section 57 including a display, a speaker, and so forth are connected. Further, to the input/output interface 55, a storage section 58 including a hard disk, a nonvolatile memory, or the like, a communication section 59 including a network interface or the like, and a drive 60 that drives a removable medium 61 are connected.

The components of the notification controlling server 1 are implemented by the CPU 51 executing a program stored in the storage section 58.

The notification controlling server 1 may include a single computer having the configuration illustrated in FIG. 12 or may include multiple computers.

Figure 13:
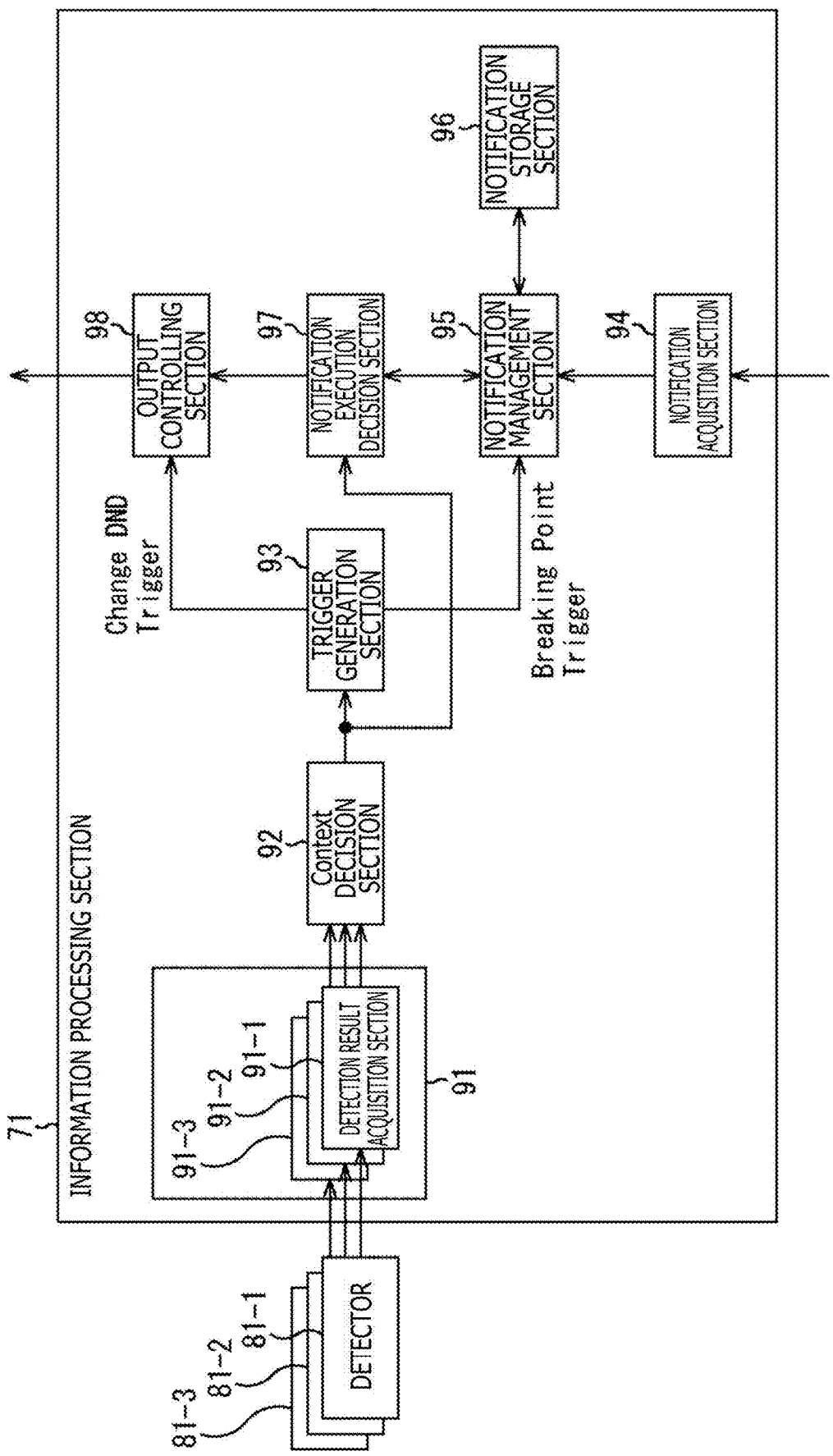
FIG. 13 is a block diagram illustrating an example of a functional configuration of the notification controlling server.

FIG. 13 is a block diagram illustrating an example of a functional configuration of the notification controlling server 1.

As illustrated in FIG. 13, an information processing section 71 is implemented in the notification controlling server 1. The information processing section 71 includes a detection result acquisition section 91, a Context decision section 92, a trigger generation section 93, a notification acquisition section 94, a notification management section 95, a notification storage section 96, a notification execution decision section 97, and an output controlling section 98.

The detection result acquisition section 91 includes multiple detection result acquisition sections. In the example in FIG. 13, detection result acquisition sections 91-1 to 91-3 are illustrated. The detection result acquisition sections 91-1 to 91-3 perform communication with devices in which detectors 81-1 to 81-3 are provided, by control of the communication section 59, to receive detection results transmitted from the detectors 81-1 to 81-3, respectively.

In a case where the detector 81-1 is provided in the earphone 11, the detection result acquisition section 91-1 performs communication with the earphone 11 to receive a detection result transmitted from the earphone 11. From the earphone 11, a detection result based on sensor data measured by the sensor provided in the earphone 11 is transmitted. In the detector 81-1 provided in the earphone 11, for example, a state of conversation and a state of movement are detected.

Further, in a case where the detector 81-2 is provided in the portable terminal 12, the detection result acquisition section 91-2 performs communication with the portable terminal 12 to receive a detection result transmitted from the portable terminal 12. In the detector 81-2 provided in the portable terminal 12, for example, a location is detected.

In a case where the detector 81-3 is provided in a server on the network 21 by which an application is executed, the detection result acquisition section 91-3 performs communication with the server to receive a detection result transmitted from the server. From the server that controls execution of an application used by the user, a detection result relating to a situation of the user detected by the server is transmitted. In the detector 81-3 provided in the server that controls execution of the application, for example, application operation is detected.

The detection result acquisition section 91 acquires detection results relating to a situation of the user, such as a detection result of DND setting, a detection result of a conversation state, a detection result of a movement state, a detection result of application operation, and a detection result of a location. Information representative of the detection results acquired by the detection result acquisition section 91 is outputted to the Context decision section 92.

The Context decision section 92 decides individual Contexts on the basis of detection results supplied from the detection result acquisition section 91. Further, the Context decision section 92 decides a comprehensive Context by combining all of the individual Contexts, as described hereinabove with reference to FIG. 6. A decision result of the comprehensive Context is supplied to the trigger generation section 93 and the notification execution decision section 97. From the Context decision section 92, decision results of comprehensive Contexts at individual timings are outputted sequentially.

The trigger generation section 93 generates a Breaking Point Trigger on the basis of the decision result of the comprehensive Context and outputs the Breaking Point Trigger to the notification management section 95. The Breaking Point Trigger is a trigger signal representative of a timing of a Breaking Point described hereinabove with reference to FIG. 10 and so forth.

Further, the trigger generation section 93 generates a Change DND Trigger on the basis of the decision result of the comprehensive Context and outputs the Change DND Trigger to the output controlling section 98. The Change DND Trigger is a trigger signal representative of a timing at which the comprehensive Context changes to DND. In the output controlling section 98, outputting of a notification is stopped in a case where the Change DND Trigger is supplied thereto during outputting of a certain notification.

The notification acquisition section 94 controls the communication section 59 to perform communication with a device that executes an application, to receive information relating to notification registration transmitted from the application. The information relating to notification registration includes, in addition to information representative of the contents of the notification, information regarding the application that is the transmission source and so forth. The information relating to notification registration received by the notification acquisition section 94 is outputted to the notification management section 95.

The notification management section 95 outputs, to the notification execution decision section 97, the information supplied from the notification acquisition section 94. The notification management section 95 outputs, to the notification storage section 96, a notification which has not been processed by the notification execution decision section 97 as a notification to be outputted immediately, and causes the notification to be Stacked in the notification storage section 96. Management of notifications based on deadlines and so forth is performed by the notification management section 95. The notification management section 95 outputs information regarding the Stacked notifications to the notification execution decision section 97 in response to a Breaking Point Trigger supplied thereto from the trigger generation section 93.

The notification execution decision section 97 specifies an importance level of the notification supplied from the notification management section 95 and decides whether or not outputting of the notification is to be executed according to the importance level of the notification and the decision result of the comprehensive Context by the Context decision section 92. The notification execution decision section 97 functions as a control section that controls outputting of the notification.

The notification execution decision section 97 has been given thereto in advance information representative of such a relation between the individual states of the comprehensive Contexts and importance levels of notifications that are capable of being outputted in the individual states as described hereinabove with reference to FIG. 7. The notification execution decision section 97 decides whether or not outputting of the notification is to be executed, on the basis of the information given thereto in advance. The information indicative of the relation illustrated in FIG. 7 is permissibility information to be used to decide whether or not outputting of the notification is to be executed.

Further, the notification execution decision section 97 has been given thereto such information representative of a relation between types of change of the comprehensive Contexts and importance levels of notifications to be made capable of being outputted when change occurs with them as described hereinabove with reference to FIG. 10. The notification execution decision section 97 decides whether or not outputting of the Stacked notification is to be executed, on the basis of the information given thereto in advance. The information representative of the relation illustrated in FIG. 10 is permissibility information to be used to decide whether or not outputting of the Stacked notification is to be executed.

The notification execution decision section 97 also performs control of interrupt described hereinabove with reference to FIG. 8 and so forth. The notification execution decision section 97 outputs information regarding the notification whose outputting is to be executed to the output controlling section 98.

The output controlling section 98 causes the notification to be outputted from the earphone 11 under the control of the notification execution decision section 97. In particular, the output controlling section 98 controls the communication section 59 to thereby perform communication with the earphone 11 and performs transmission of information regarding the notification to the earphone 11 or the like to cause the earphone 11 to output the notification.

Further, in a case where a Change DND Trigger is supplied to the output controlling section 98 from the trigger generation section 93 while a certain notification is being outputted, the output controlling section 98 causes the outputting of the notification to be stopped.

Configuration of Earphone 11

Figure 14:
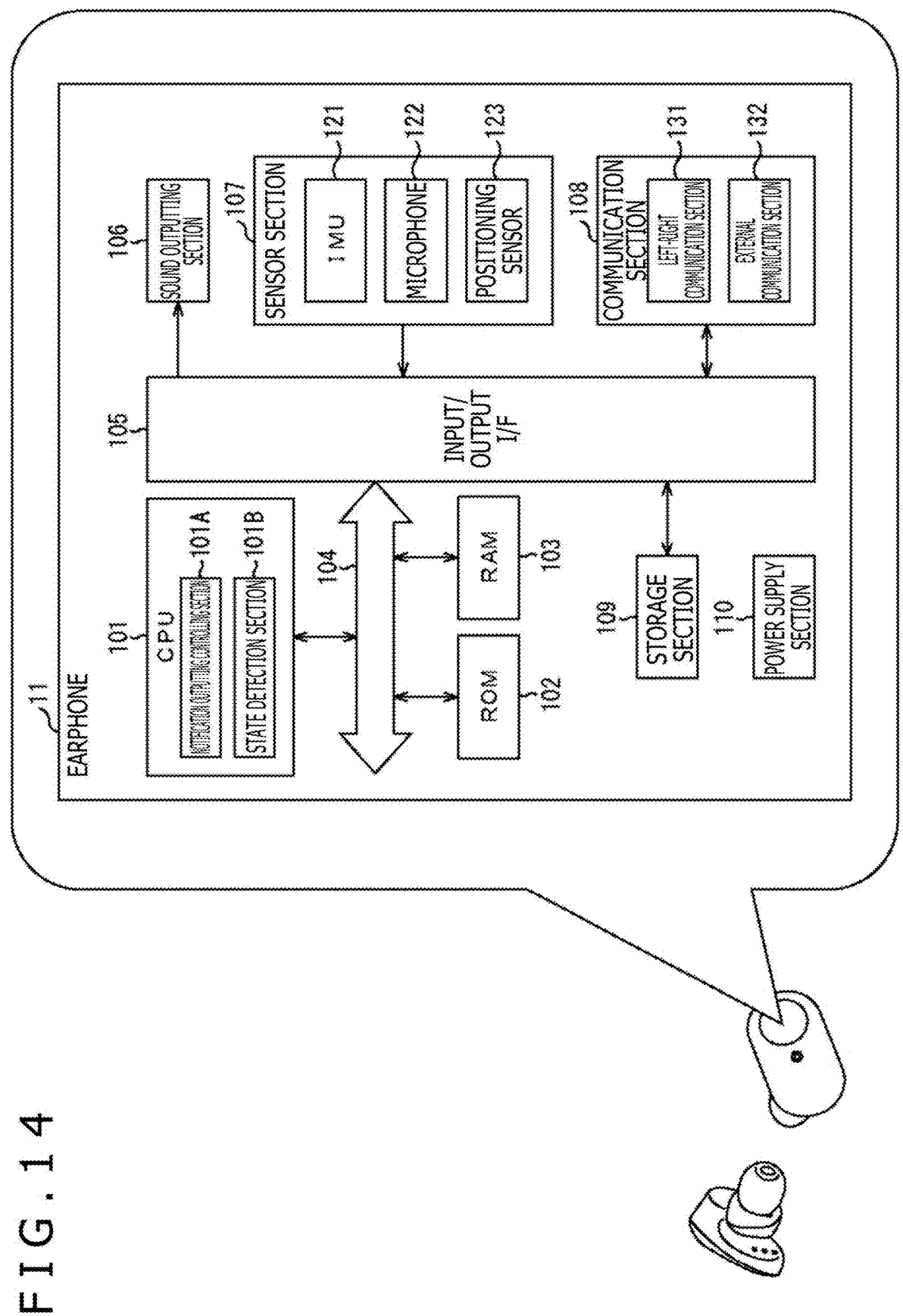
FIG. 14 is a block diagram illustrating an example of a configuration of an earphone.

FIG. 14 is a block diagram illustrating an example of a configuration of the earphone 11.

As illustrated in a balloon in FIG. 14, the earphone 11 includes a CPU 101, a ROM 102, a RAM 103, a bus 104, an input/output I/F section 105, a sound outputting section 106, a sensor section 107, a communication section 108, a storage section 109, and a power supply section 110.

The components illustrated in FIG. 14 are accommodated in each of left and right housings that configure the earphone 11. A terminal for the left ear configuring the earphone 11 is referred to as an earphone 11L, and a terminal for the right ear is referred to as an earphone 11R.

The CPU 101, the ROM 102, and the RAM 103 are connected to each other by the bus 104. In the CPU 101, a notification outputting controlling section 101A and a state detection section 101B are implemented by execution of a predetermined program.

The notification outputting controlling section 101A performs communication with the notification controlling server 1 and controls the sound outputting section 106 to output a notification under the control of the notification controlling server 1.

The state detection section 101B detects a state of the user on the basis of sensor data supplied from the sensor section 107. In particular, in a case where a predetermined detector from among the detectors described hereinabove with reference to FIG. 3 is provided in the earphone 11, the state detection section 101B functions as the detector provided in the earphone 11.

For example, in a case where the conversation detector D2 is provided in the earphone 11, the state detection section 101B detects a conversation state of the user on the basis of sound collected by a microphone 122 of the sensor section 107.

Meanwhile, in a case where the movement state detector D3 is provided in the earphone 11, the state detection section 101B detects a movement state of the user on the basis of sensor data detected by an IMU 121 of the sensor section 107.

In a case where the position detector D5 is provided in the earphone 11, the state detection section 101B detects a location of the user on the basis of position information detected by a positioning sensor 123 of the sensor section 107.

Information regarding a state of the user (individual Context), the state being detected by the state detection section 101B as a detector, is transmitted to the notification controlling server 1.

All detectors described hereinabove with reference to FIG. 3 may be implemented by the state detection section 101B such that decision of a comprehensive Context is performed by the state detection section 101B.

To the bus 104, the input/output I/F section 105 is further connected. To the input/output I/F section 105, the sound outputting section 106, the sensor section 107, the communication section 108, and the storage section 109 are connected.

The sound outputting section 106 outputs, for example, music reproduced by the portable terminal 12. Further, the sound outputting section 106 outputs sound of a notification under the control of the notification outputting controlling section 101A.

The sensor section 107 includes the IMU (Inertial Measurement Unit) 121, the microphone 122, and the positioning sensor 123.

The IMU 121 includes an acceleration sensor, a gyro sensor, and so forth. The IMU 121 measures an acceleration, an angular acceleration, and so forth of the earphone 11.

The microphone 122 collects voice of the user and sound of the surrounding environment.

The positioning sensor 123 includes a GPS (Global Positioning System) sensor and so forth. The positioning sensor 123 measures the position of the user.

Sensor data detected by the sensor section 107 is supplied to the state detection section 101B and is used for decision of the state of the user. In a case where the detectors described hereinabove with reference to FIG. 3 are provided in an external apparatus such as the notification controlling server 1 or the portable terminal 12, sensor data detected by the sensor section 107 is transmitted to the external apparatus through the communication section 108 and is used for decision of the state of the user.

The communication section 108 includes a left-right communication section 131 and an external communication section 132.

The left-right communication section 131 is configured as a communication module compatible with near field communication such as NFMI. The left-right communication section 131 performs communication with the earphone 11R to exchange sensor data and so forth.

The external communication section 132 is configured as a communication module compatible with wireless communication such as Bluetooth (registered trademark), a wireless LAN (Local Area Network), or communication of the cellular type (LTE-Advanced, 5G, or the like) or with wired communication. The external communication section 132 performs communication with an external apparatus to perform transmission and reception of various kinds of information such as music data, sensor data, information regarding a notification, and so forth.

The storage section 109 includes a semiconductor memory or the like. In the storage section 109, programs to be executed by the CPU 101 and so forth are recorded.

The power supply section 110 includes a battery. The power supply section 110 supplies electric power to the components of the earphone 11.

It is to be noted that the portable terminal 12 configured as a smartphone has a configuration similar to that of the notification controlling server 1 described hereinabove with reference to FIG. 12. The portable terminal 12 may otherwise include a device other than a smartphone, such as a tablet terminal or a PC.

<Operation of Notification Controlling Server>

Figure 15:
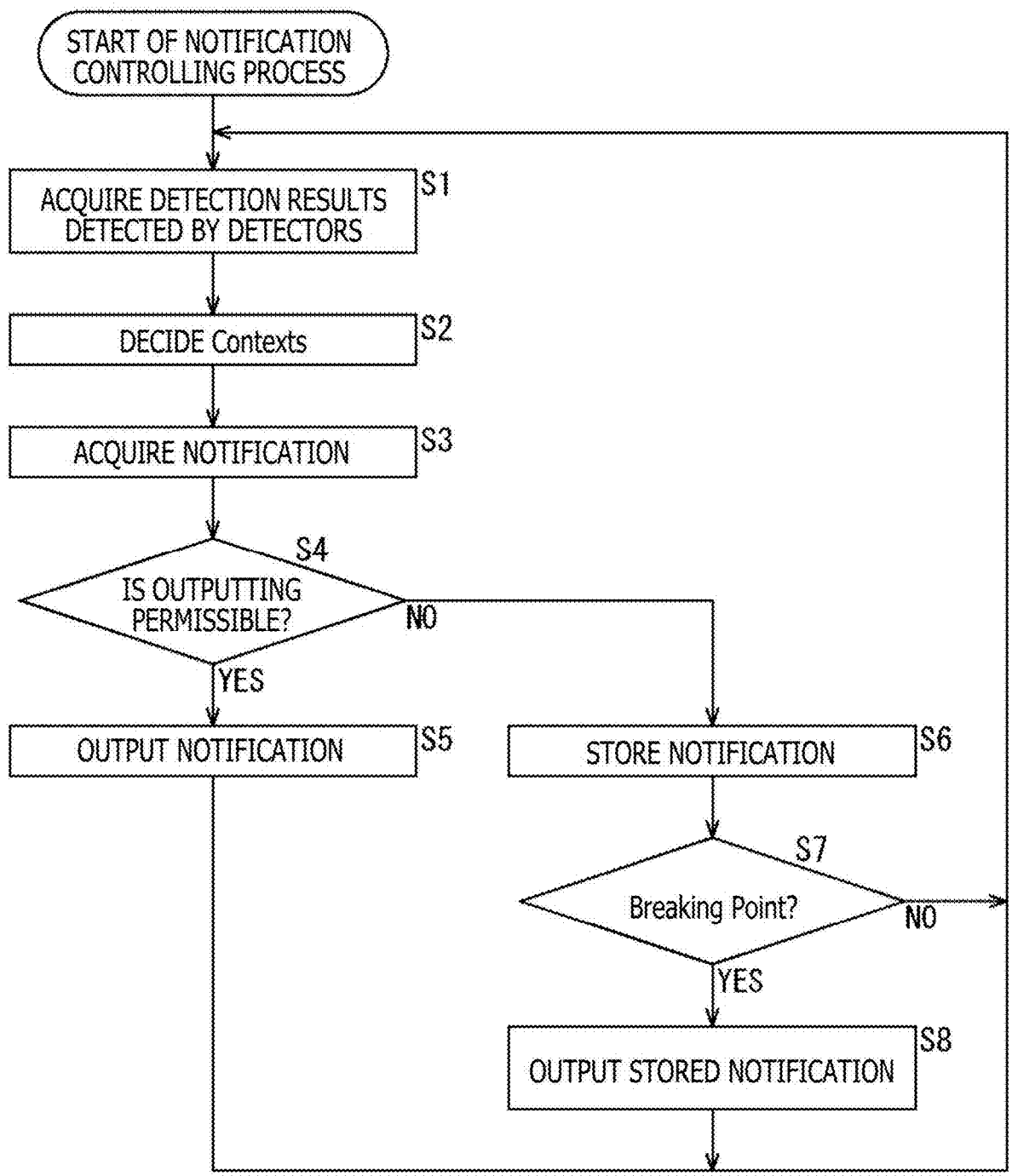
FIG. 15 is a flow chart illustrating operation of the notification controlling server.

Here, basic operation of the notification controlling server 1 is described with reference to a flow chart of FIG. 15.

In step S1, the detection result acquisition section 91 acquires detection results transmitted thereto from the detectors 81-1 to 81-3.

In step S2, the Context decision section 92 decides individual Contexts on the basis of the detection results supplied from the detection result acquisition section 91 and combines all of the individual Contexts to thereby decide a comprehensive Context.

In step S3, the notification acquisition section 94 acquires information relating to notification registration transmitted from an application. The acquired information relating to the notification registration is outputted to the notification execution decision section 97 via the notification management section 95.

In step S4, the notification execution decision section 97 specifies the importance level of the notification whose notification registration has been performed, and decides whether or not outputting of the notification is permissible, on the basis of the importance level of the notification and the decision result of the comprehensive Context.

In a case where it is decided in step S4 that the outputting is permissible, the output controlling section 98 causes the notification to be outputted from the earphone 11 in step S5. After the outputting of the notification is performed, the processing returns to step S1, and the processes described above are repeated.

On the other hand, in a case where it is decided in step S4 that the outputting is not permissible, the notification management section 95 outputs the information regarding the notification whose notification registration has been performed to the notification storage section 96, and causes the information to be stored (Stacked) in the notification storage section 96, in step S6.

In step S7, the notification management section 95 decides whether or not it is a timing of a Breaking Point.

In a case where the notification management section 95 decides in step S7 that it is a timing of a Breaking Point because a Breaking Point Trigger is supplied from the trigger generation section 93, the notification management section 95 supplies the Stacked notification to the notification execution decision section 97 and causes the Stacked notification to be outputted in step S8.

After the outputting of the Stacked notification is performed or in a case where it is decided in step S7 that it is not a timing of a Breaking Point, the processing returns to step S1, and the processes described above are repeated.

By the processes described above, the notification controlling server 1 can cause a notification of the contents appropriate to the user to be outputted at an appropriate timing.

<Modifications>

Management of Stacked Notifications

As described hereinabove, a Stacked notification is outputted at a timing of a Breaking Point. In a case where multiple notifications are Stacked, they may be outputted merely in the Stacked order or may be outputted in a descending order of the importance level.

Further, multiple notifications may be grouped in a predetermined unit and outputted in a unit of a group.

Figure 16:
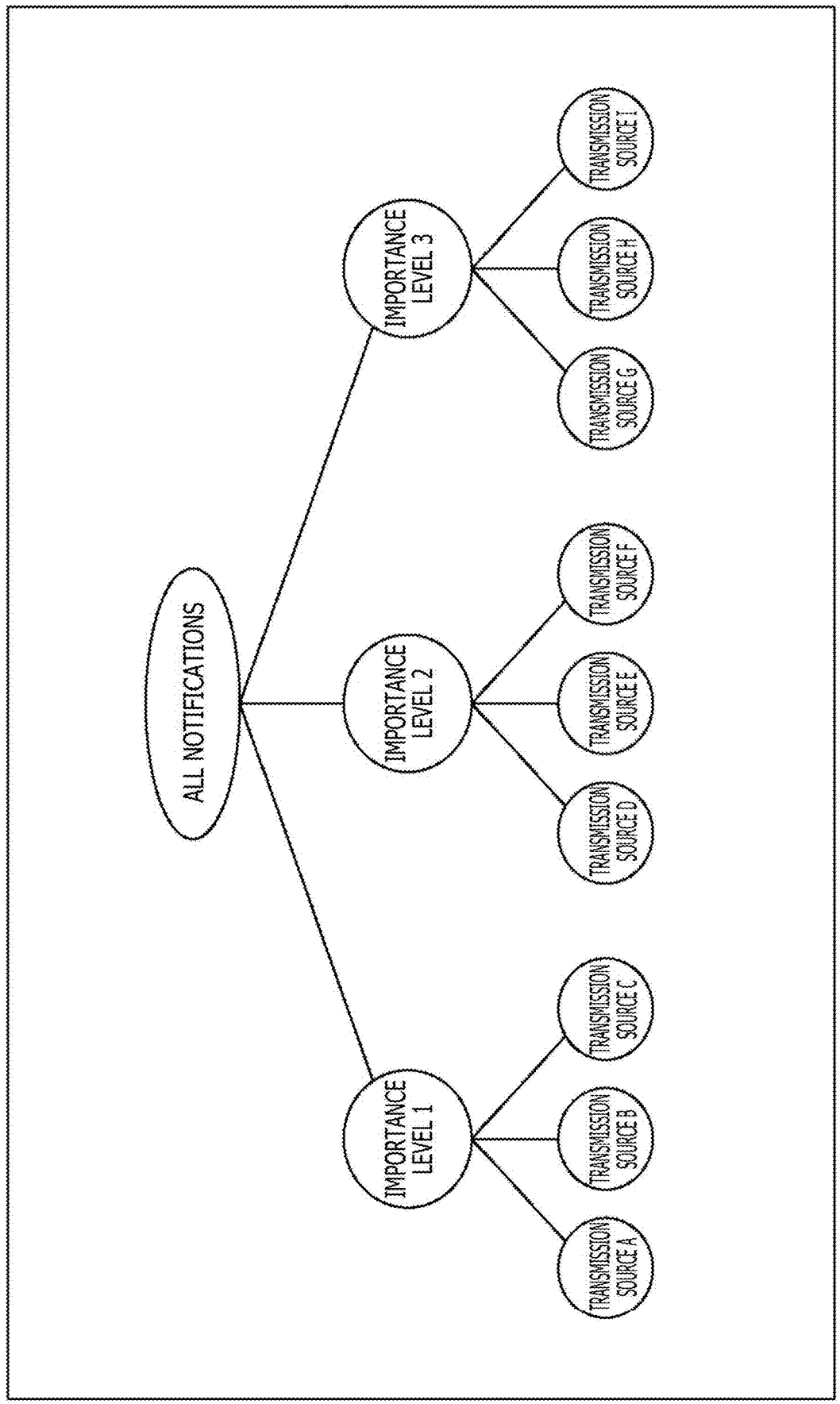
FIG. 16 is a diagram illustrating an example of grouping.

FIG. 16 is a diagram illustrating an example of grouping.

In the example in FIG. 16, Stacked notifications are grouped for each importance level and are further grouped for each transmission source (for each application). For example, the notifications are outputted in order beginning with a notification included in a group on the left side in FIG. 16.

In the case of the example in FIG. 16, groups are outputted in such an order that a group of notifications which are notifications of the importance level 1 and whose transmission source is the application A is outputted first and then a group of notifications whose transmission source is the application B and a group of notifications whose transmission source is the application C are outputted in order. After the outputting of the notifications of the importance level 1 comes to an end, the notifications of the importance level 2 and the notifications of the importance level 3 are individually outputted in order in a unit of a group.

By grouping notifications such that notifications of each same importance level belong to a same group and notifications of each same transmission source belong to a same group as described above, it is possible to output notifications of a higher importance level collectively in a unit of an application.

It may be made possible for the user to set a notification of which application is to be outputted earlier.

Notifications may be outputted not in the Stacked order but in an ascending order of the length of the period of time taken for outputting.

From among the latest notifications of individual applications, the notifications may be outputted in an ascending order of the period of time elapsed after its notification registration is performed.

Some notification is less beneficial to the user if it is not the latest notification like a notification of news. It may be made possible to set for each application such that a notification is not Stacked in a case where the notification is not outputted immediately when notification registration of it is performed.

Coping with Case in which State of User Changes During Outputting of Notification As described hereinabove, in a case where the comprehensive Context changes to the DND, outputting of a notification is stopped. The notification whose outputting is stopped may be discarded as it is, or outputting of the same may be resumed at a timing of a Breaking Point or the like.

Processing of a notification that is being outputted may be changed suitably according to a way of change of the comprehensive Context or according to the importance level of the notification that is being outputted.

For example, in a case where the comprehensive Context changes from the Breaking Time to the Neutral, the outputting is stopped in a case where the notification that is being outputted is a notification of the importance level 3.

In a case where the comprehensive Context changes from the Breaking Time to the DND, the outputting is stopped in a case where the notification that is being outputted is a notification of the importance level 2 or the importance level 3.

In a case where the comprehensive Context changes from the Neutral to the DND, the outputting is stopped in a case where the notification that is being outputted is a notification of the importance level 2.

Example in which Multi-Devices are Used

Although it is described that a device that is an outputting destination of a notification is the earphone 11, various kinds of devices that can output sound can be used as a device of an outputting destination. In this case, the device of the outputting destination may be switchable according to a state of the user.

Figure 17:
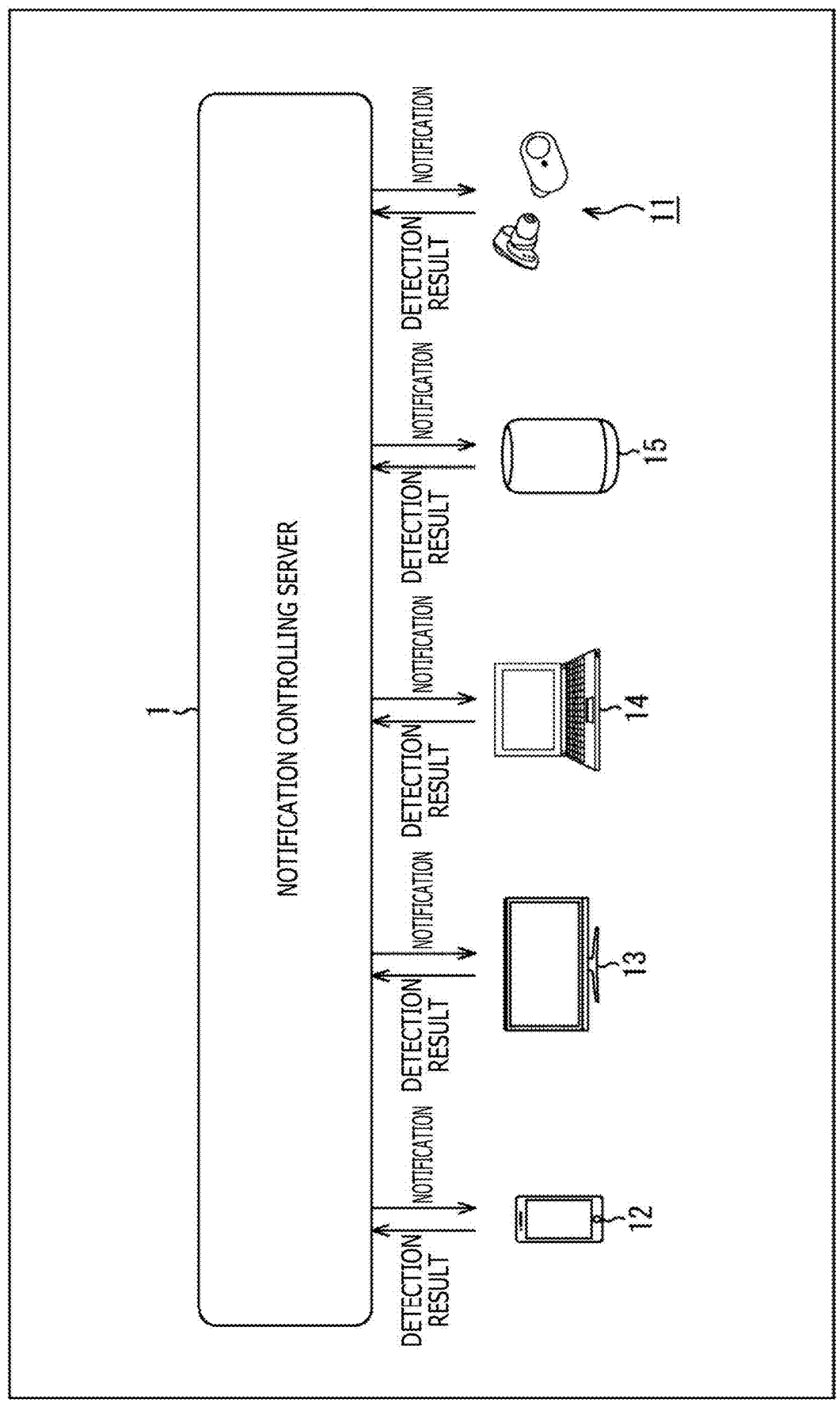
FIG. 17 is a diagram illustrating an example of a configuration of a notification system that uses multi-devices.

FIG. 17 is a view illustrating a configuration of a notification system that uses multi-devices.

In the example in FIG. 17, in addition to the earphone 11 and the portable terminal 12, a TV 13, a PC 14, and a smart speaker 15 are connected, as devices for an outputting destination of a notification, to the notification controlling server 1. Each of the devices illustrated in FIG. 17 is a device that is used by the same user and is capable of outputting sound.

Each of the devices from the earphone 11 to the smart speaker 15 includes a detector, and a detection result of a state of the user is transmitted to the notification controlling server 1. The notification controlling server 1 decides a comprehensive Context by combining individual Contexts detected by the devices from the earphone 11 to the smart speaker 15, and controls outputting of the notification.

The device of the outputting destination is switched such that, for example, in a case where the user is operating the portable terminal 12, the portable terminal 12 is used as the device of the outputting destination of a notification while, in a case where the user is operating the TV 13, the TV 13 is used as the device of the outputting destination.

Figure 18:
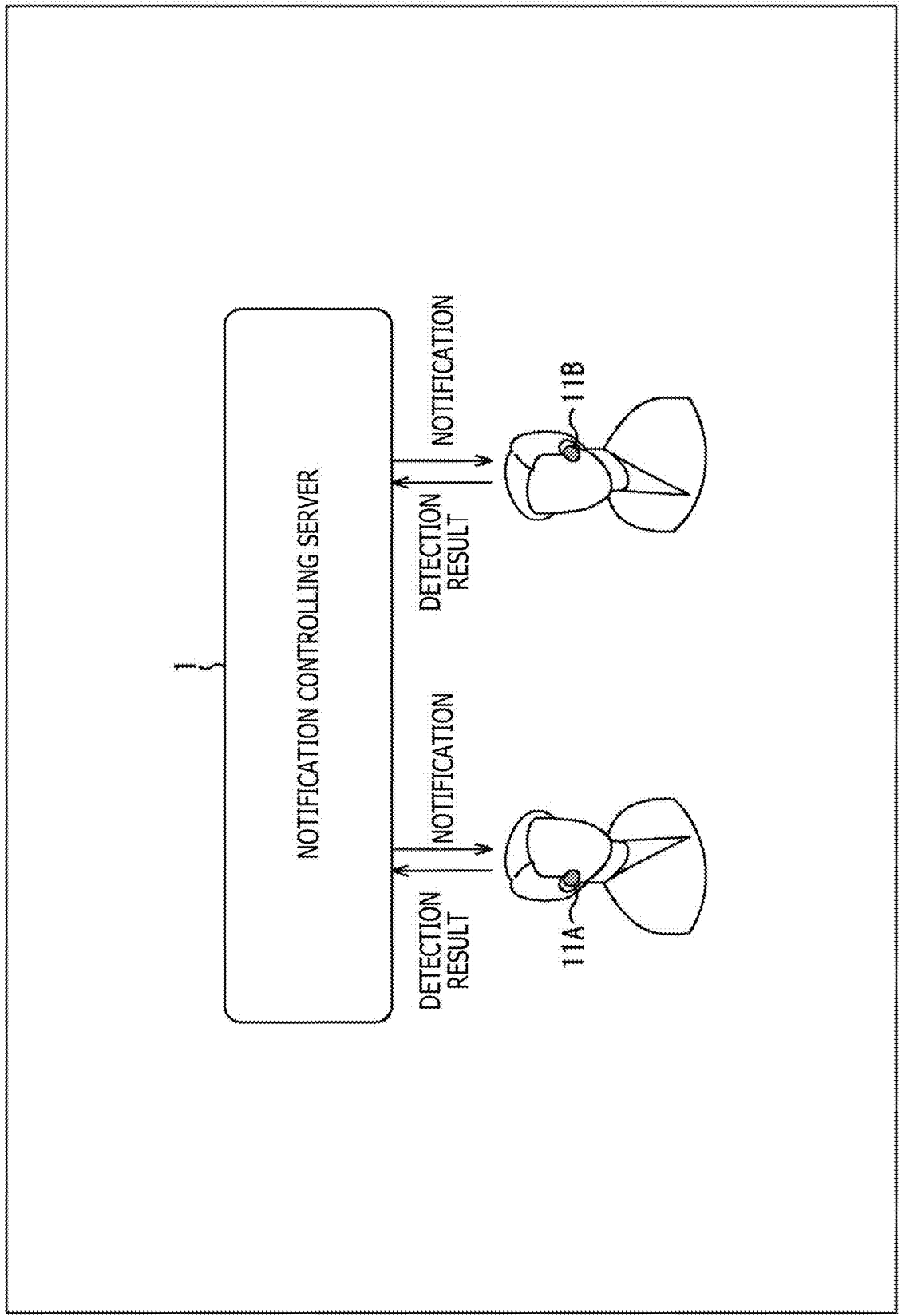
FIG. 18 is a diagram illustrating another example of the configuration of the notification system that uses multi-devices.

In a case where multi-devices are used, the number of users who are to hear a notification may not be one, but multiple persons may hear the notification as illustrated in FIG. 18. In the example in FIG. 18, outputting of a notification to a user A who wears an earphone 11A and a notification to a user B who wears an earphone 11B is controlled by the notification controlling server 1.

In this case, outputting of a notification is controlled on the basis of the state of the user A and the state of the user B.

Figure 19:
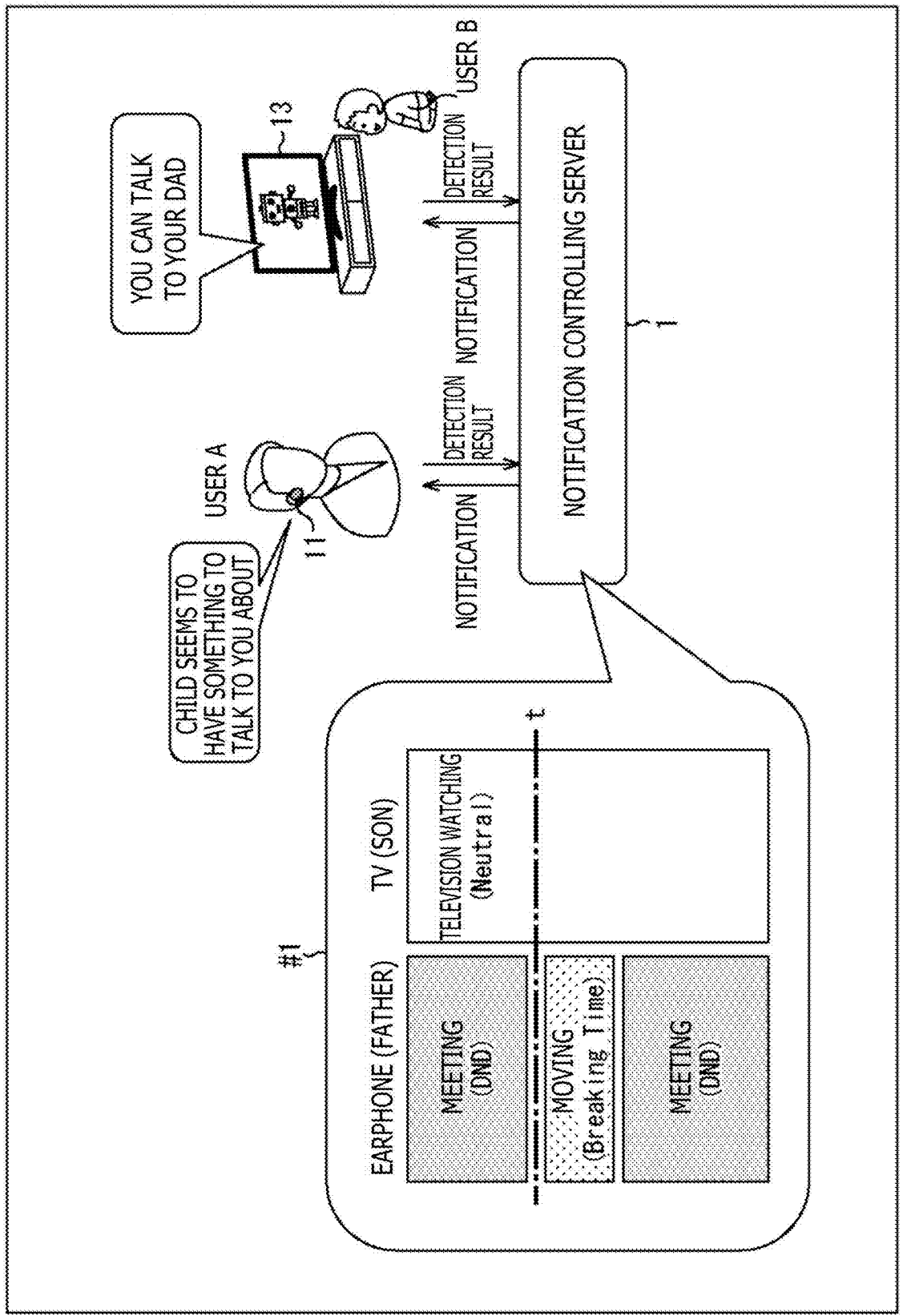
FIG. 19 is a view illustrating an example of notifications to multiple users.

FIG. 19 is a view illustrating an example of notification to multiple users.

Here, it is assumed that notifications to the user A who wears the earphone 11 and the user B who is watching the TV 13 are outputted. The user A is a father and the user B is a son of the user A.

The notification controlling server 1 decides a state of the father on the basis of a detection result by the earphone 11 and decides a state of the son on the basis of a detection result by the TV 13, as illustrated in a balloon #1. In the example in FIG. 19, the state of the father changes from the DND to the Breaking Time and then changes from the Breaking Time to the DND. The state of the son is normally the Neutral.

For example, at a timing of time t at which the state of the father changes from the DND to the Breaking Time, a notification "CHILD SEEMS TO HAVE SOMETHING TO TALK TO YOU ABOUT" is outputted from the earphone 11 worn by the father, under the control of the notification controlling server 1. Further, from the TV 13 used by the son, a notification "YOU CAN TALK TO YOUR DAD" is outputted.

As described above, notifications to multiple users may be outputted from devices being used by the individual users, on the basis of states of the multiple users.

Example of Attribute Information

Although it is described that, at the time of notification registration, the transmission source can set a deadline for a notification, other attribute information may be made settable. The notification management section 95 (FIG. 13) of the notification controlling server 1 manages notifications whose notification registration has been performed according to the contents designated by the attribute information.

As the attribute information, for example, "update," "real time," and "no Stack" are set in addition to the "deadline."

The "update" represents that, in a case where notification registration is performed from the same transmission source, an old notification is discarded. In a case where registration of a notification to which the attribute information of the "update" is set is performed, any notification registered before that by the same transmission source is discarded, and only the latest notification is Stacked.

The "real time" represents that, in a case where notification registration is performed, the notification is outputted immediately.

The "no Stack" represents that, even in a case where the notification cannot be outputted immediately, the notification is not Stacked. In a case where registration of a notification to which the attribute information of the "no Stack" is set is performed and the notification cannot be outputted immediately, the notification is discarded.

Example of Implementation

Although it is described that the information processing section 71 described hereinabove with reference to FIG. 13 is implemented in the notification controlling server 1, the information processing section 71 may otherwise be implemented in a different apparatus.

Figure 20A:
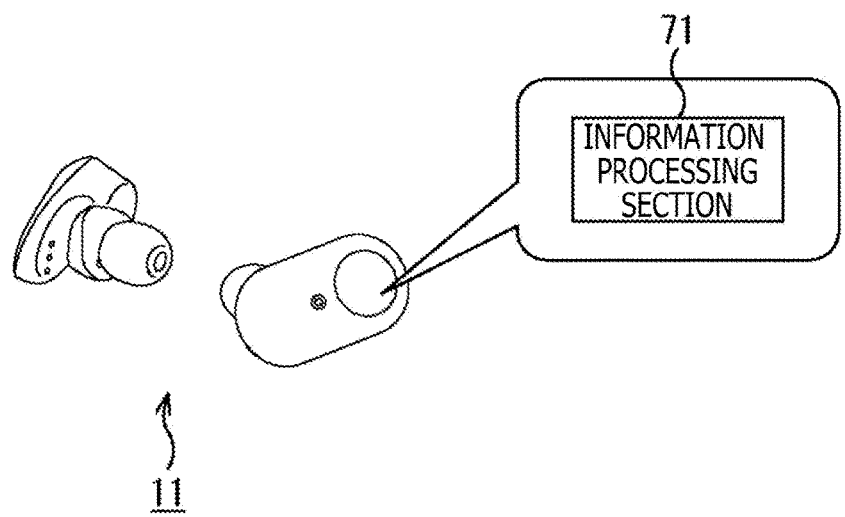
FIGS. 20A and 20B depict views illustrating other examples of implementation.
Figure 20B:
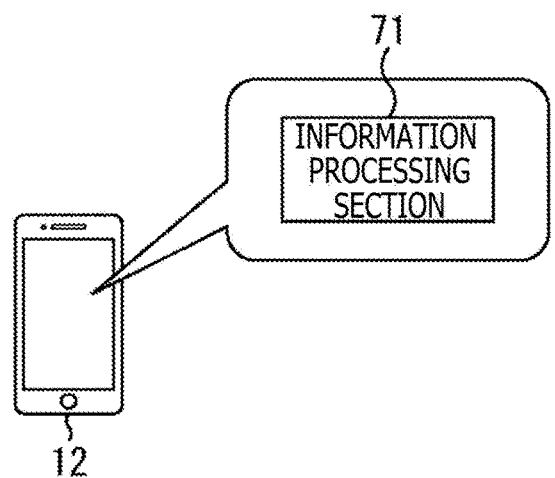

FIGS. 20A and 20B illustrate other examples of implementation.

It is possible to implement the information processing section 71 in the earphone 11 as illustrated in FIG. 20A. In this case, the information processing section 71 is implemented in the earphone 11 by a predetermined program executed by the CPU 101 of FIG. 14.

Further, it is possible to implement the information processing section 71 in the portable terminal 12 as illustrated in FIG. 20B. In this case, the information processing section 71 is implemented in the portable terminal 12 by a predetermined program executed by the CPU of the portable terminal 12.

The components of the entire information processing section 71 may not be implemented in one apparatus but may be implemented in multiple apparatuses in a shared manner.

Figure 21:
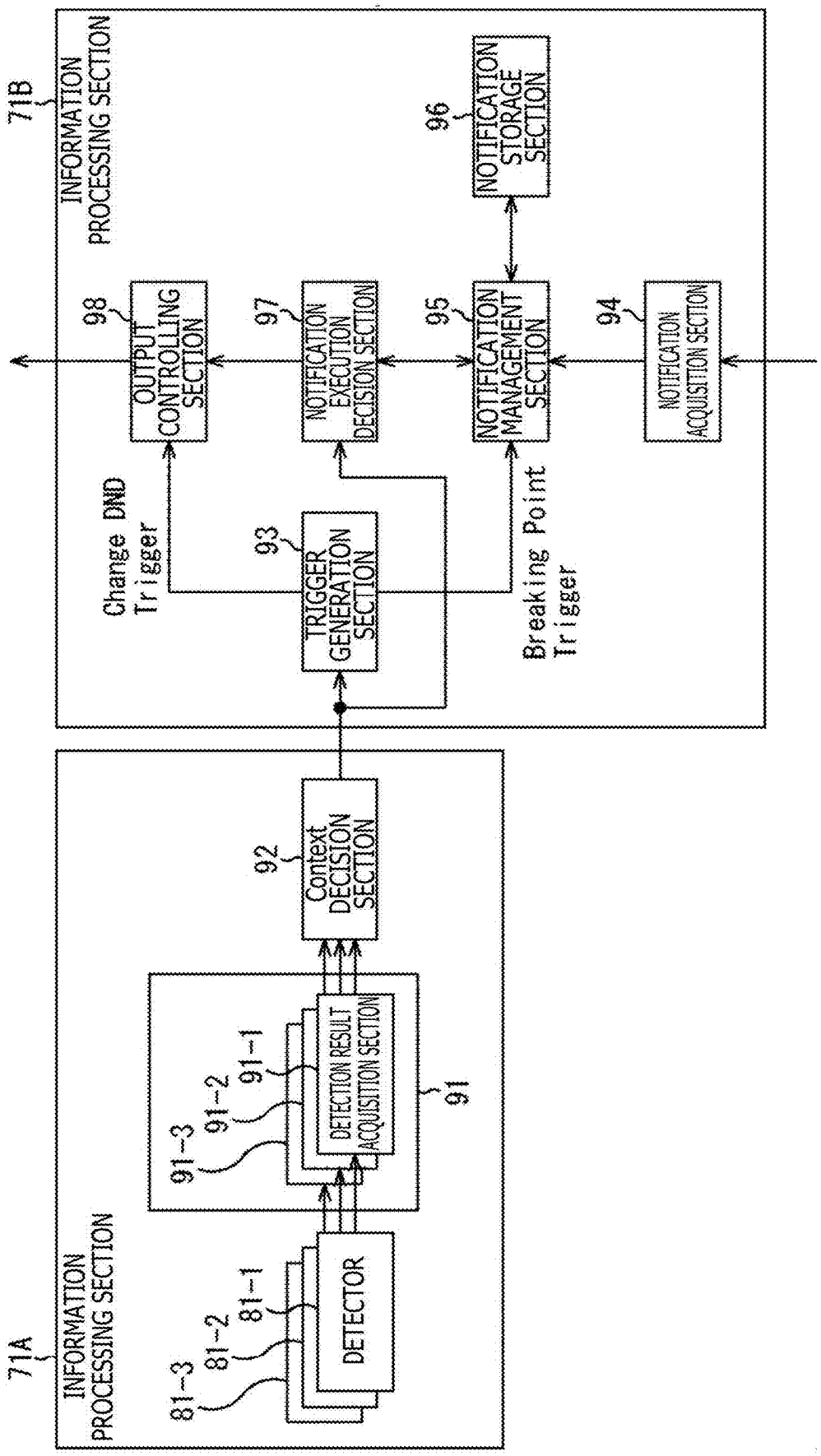
FIG. 21 is a diagram illustrating a different example of implementation.

FIG. 21 is a view illustrating a different example of implementation.

In the example in FIG. 21, the configuration of the entire information processing section 71 in FIG. 13 is implemented by an information processing section 71A and another information processing section 71B. The information processing section 71A includes the detection result acquisition section 91 and the Context decision section 92, and the information processing section 71B includes the trigger generation section 93, the notification acquisition section 94, the notification management section 95, the notification storage section 96, the notification execution decision section 97, and the output controlling section 98. It is to be noted that, in the example in FIG. 21, the detectors 81-1 to 81-3 are provided in the information processing section 71A.

For example, the information processing section 71A is implemented in the earphone 11, and the information processing section 71B is implemented in the notification controlling server 1. In such a manner, it is possible to implement the components of the information processing section 71 in a shared manner in multiple apparatuses such that at least any one of the components from among the components of the information processing section 71 are implemented in the earphone 11 while the other components are implemented in the notification controlling server 1.

The combination of functioning sections included in the information processing section 71A and functioning sections included in the information processing section 71B can freely be changed. For example, only the detection result acquisition section 91 may be provided in the information processing section 71A while the Context decision section 92 is provided in the information processing section 71B together with the trigger generation section 93, the notification acquisition section 94, the notification management section 95, the notification storage section 96, the notification execution decision section 97, and the output controlling section 98.

The components of the information processing section 71 may be implemented not in two apparatuses but in three or more apparatuses in a shared manner.

Other Examples

Not notification for presenting information but notification for asking for a response to a user may be performed. The response by the user may be performed through sound by vocalization or may be performed by a movement of the body by shaking the head, by touching with a predetermined position of a housing of the earphone 11, or the like.

A predetermined application may be started in response to a response by a user such that an action is performed. The action by the application includes reproduction of music, transmission of an email, setting of an alarm, and so forth.

In a case where it is made possible to operate a device by sound or by shaking of the head, it may be made possible to cancel a notification that is being outputted.

Setting of a notification filter may be performed such that, in a case where the user cancels a notification of the same transmission source for a multiple number of times, subsequent outputting of a notification from the same transmission source is suppressed. Such a notification filter as just described may be set by exchange in a dialogue format between the user and the earphone 11.

Example of Program

While the series of processes described above can be executed by hardware, it can otherwise be executed also by software. In the case where the series of processes is executed by software, a program that configures the software is installed into a computer incorporated in dedicated hardware or a general-purpose personal computer.

The program to be installed is provided by being recorded in the removable medium 61 illustrated in FIG. 12, the removable medium 61 including an optical disk (a CD-ROM (Compact Disc-Read Only Memory), a DVD (Digital Versatile Disc), or a like disk), a semiconductor memory, or the like. Further, the program may be provided through a wired or wireless transmission medium such as a local area network, the Internet, or digital broadcasting. The program can be installed in the ROM 52 or the storage section 58 in advance.

A program to be executed by a computer may be a program in which the processes are performed in a time series in the order as described in the present specification or may be a program in which the processes are executed in parallel or executed individually at necessary timings such as when the process is called.

In the present specification, the term "system" is used to signify an aggregation of multiple components (devices, modules (parts), and so forth), and it does not matter whether or not all components are accommodated in the same housing. Accordingly, multiple apparatuses accommodated in separate housings and connected to each other through a network are a system, and also one apparatus in which multiple modules are accommodated in a single housing is a system.

It is to be noted that the advantages described in the present specification are merely exemplary and are not restrictive, and other advantageous may be available.

The embodiment of the present technology is not restricted to the embodiment described above, and various alterations can be made without departing from the spirit and scope of the present technology.

For example, the present technology can assume a configuration for cloud computing in which one function is shared and processed cooperatively by multiple apparatuses through a network.

Further, each of the steps described hereinabove with reference to the flow charts can be executed by a single apparatus and can also be shared and executed by multiple apparatuses.

Further, in a case where multiple processes are included in one step, the multiple processes included in the one step can be executed by one apparatus and can also be shared and executed by multiple apparatuses.

Example of Combination of Configurations

The present technology can also take such configurations as described below.

(1)

An information processing apparatus including:
   a control section that controls, according to a state of a user, the state being decided on the basis of multiple types of detection results relating to a situation of the user, and an importance level set to each of notifications to the user, outputting of the notifications by sound.

(2)

The information processing apparatus according to (1) above, further including:
   a state decision section that decides, on the basis of the multiple types of detection results, which one of multiple notification states set in advance as states corresponding to levels of ease of reception of the notifications the state of the user is.

(3)

The information processing apparatus according to (2) above, in which the control section controls outputting of the notifications on the basis of first permissibility information representative of a relation between the notification states and the importance levels of the notifications that are capable of being outputted in the notification states.

(4)

The information processing apparatus according to (3) above, further including:

a notification management section that stores information relating to a notification that is not outputted when registration of the notifications is performed.

(5)

The information processing apparatus according to (4) above, in which the control section causes the stored notification to be outputted at a timing at which the notification state of the user changes to a state suitable for outputting of the notification.

(6)

The information processing apparatus according to (5) above, in which the control section controls outputting of the stored notification on the basis of second permissibility information representative of a relation between types of the change of the notification state and the importance levels of the notifications that are made permissible to output when change of the notification states occurs.

(7)

The information processing apparatus according to any one of (1) to (6) above, in which the control section controls outputting of the notifications on the basis of individual states of multiple users.

(8)

The information processing apparatus according to any one of (1) to (7) above, in which the control section causes a corresponding one of the notifications to be outputted from a headphone worn by the user.

(9)

The information processing apparatus according to any one of (1) to (8) above, further including:

a detection result acquisition section that acquires a detection result based on sensor data measured by a sensor provided on a device worn by the user.

(10)

The information processing apparatus according to (9) above, in which the detection result acquisition section acquires a detection result based on information from a server that controls execution of an application used by the user.

(11)

An information processing method performed by an information processing apparatus, including:

controlling, according to a state of a user, the state being decided on the basis of multiple types of detection results relating to a situation of the user, and an importance level set to each of notifications to the user, outputting of the notifications by sound.

(12)

A program for causing a computer to execute:

processing of controlling, according to a state of a user, the state being decided on the basis of multiple types of detection results relating to a situation of the user, and an importance level set to each of notifications to the user, outputting of the notifications by sound.

(13)

An outputting apparatus including:

an output controlling section that outputs notifications by sound, under control of an information processing apparatus that controls, according to a state of a user, the state being decided on the basis of multiple types of detection results relating to a situation of the user, and an importance level set to each of the notifications to the user, outputting of the notifications.

(14)

The outputting apparatus according to (13) above, further including:

a sensor;

a detection section that detects a situation of the user on the basis of sensor data measured by the sensor; and a communication section that transmits a result of the detection by the detection section to the information processing apparatus.

(15)

An outputting method performed by an outputting apparatus, including:

outputting notifications by sound, under control of an information processing apparatus that controls, according to a state of a user, the state being decided on the basis of multiple types of detection results relating to a situation of the user, and an importance level set to each of the notifications to the user, outputting of the notifications.

(16)

A program for causing a computer of an outputting apparatus to execute:

processing of outputting notifications by sound, under control of an information processing apparatus that controls, according to a state of a user, the state being decided on the basis of multiple types of detection results relating to a situation of the user, and an importance level set to each of the notifications to the user, outputting of the notifications.

(17)

A notification system including:

an information processing apparatus that controls, according to a state of a user, the state being decided on the basis of multiple types of detection results relating to a situation of the user, and an importance level set to each of notifications to the user, outputting of the notifications by sound; and an outputting apparatus that is used by the user and outputs a corresponding one of the notifications by sound under control of the information processing apparatus.

REFERENCE SIGNS LIST

1: Notification controlling server
11: Earphone
12: Portable terminal
71: Information processing section
81-1 to 81-3: Detector
91-1 to 91-3: Detection result acquisition section
92: Context decision
93: Trigger generation section
94: Notification acquisition section
95: Notification management section
96: Notification storage section
97: Notification execution decision section 98: Output controlling section

The invention claimed is:

1. An information processing apparatus, comprising:
a state decision section configured to:
determine a first state of a plurality of states of a user, wherein
the first state is determined based on multiple types of detection results, and
the multiple types of detection results correspond to a situation of the user; and
a control section configured to:
determine a plurality of importance levels of a plurality of notifications,
wherein a first importance level of the plurality of importance levels corresponds to a first notification of the plurality of notifications;
control, based on the determined first state of the user and the first importance level, an output device to output the first notification by sound;
determine a second notification of the plurality of notifications corresponding to a second importance level of the plurality of importance levels,
wherein the second notification has a priority, based on the second importance level, over the first notification;
determine that an output of the second notification is permissible based on the priority of the second notification over the first notification;
suspend the output of the first notification based on the determination that the output of the second notification is permissible; and
control the output device to output, based on the suspended output of the first notification, the second notification by the sound.

2. The information processing apparatus according to claim 1, wherein
the plurality of states corresponds to multiple notification states, and
the multiple notification states correspond to a plurality of levels of ease of reception of the plurality of notifications.

3. The information processing apparatus according to claim 2, wherein
the control section is further configured to output the plurality of notifications based on first permissibility information, and
the first permissibility information indicates a relation between the plurality of states and the plurality of importance levels.

4. The information processing apparatus according to claim 3, further comprising a notification management section configured to store information associated with a third notification of the plurality of notifications,
wherein an output of the third notification is stopped based on registration of the plurality of notifications.

5. The information processing apparatus according to claim 4, wherein the control section is further configured to control the output device to output the third notification at a time of change of the first state of the user to a second state of the user.

6. The information processing apparatus according to claim 5, wherein
the control section is further configured to control the output of the third notification based on second permissibility information, and
the second permissibility information indicates a relation between types of the change of the first state and the plurality of importance levels of the notifications.

7. The information processing apparatus according to claim 1, wherein
the control section is further configured to control, based on individual states of a plurality of users, the output device to output the plurality of notifications, and
the plurality of users includes the user.

8. The information processing apparatus according to claim 1, wherein
the control section is further configured to control a headphone to output of at least one notification of the plurality of notifications, and
the headphone is associated with the user.

9. The information processing apparatus according to claim 1, further comprising a detection result acquisition section configured to acquire the multiple types of detection results based on sensor data measured by a plurality of sensors,
wherein the plurality of sensors is on a device associated with the user.

10. The information processing apparatus according to claim 9, wherein
the detection result acquisition section is further configured to acquire the sensor data based on specific information from a server, and
the server controls an execution of an application associated with the user.

11. An information processing method, comprising:
in an information processing apparatus:
determining a state of a plurality of states of a user, wherein
the state is determined based on multiple types of detection results, and
the multiple types of detection results correspond to a situation of the user;
determining a plurality of importance levels of a plurality of notifications,
wherein a first importance level of the plurality of importance levels corresponds to a first notification of the plurality of notifications;
controlling, based on the determined state of the user and the first importance level, an output device to output the first notification by sound;
determining a second notification of the plurality of notifications corresponding to a second importance level of the plurality of importance levels,
wherein the second notification has a priority, based on the second importance level, over the first notification:
determining that an output of the second notification is permissible based on the priority of the second notification over the first notification;
suspending the output of the first notification based on the determination that the output of the second notification is permissible; and
controlling the output device to output, based on the suspended output of the first notification, the second notification by the sound.

12. A non-transitory computer-readable medium having stored thereon, computer-executable instructions which, when executed by a computer, cause the computer to execute operations, the operations comprising:
determining a state of a plurality of states of a user, wherein the state is determined based on multiple types of detection results, and
the multiple types of detection results correspond to a situation of the user;
determining a plurality of importance levels of a plurality of notifications,
wherein a first importance level of the plurality of importance levels corresponds to a first notification of the plurality of notifications;
controlling, based on the determined state of the user and the first importance level, an output device to output the first notification by sound;
determining a second notification of the plurality of notifications corresponding to a second importance level of the plurality of importance levels,
wherein the second notification has a priority, based on the second importance level, over the first notification;
determining that an output of the second notification is permissible based on the priority of the second notification over the first notification;
suspending the output of the first notification based on the determination that the output of the second notification is permissible; and
controlling the output device to output, based on the suspended output of the first notification, the second notification by the sound.

13. An outputting apparatus, comprising:
an output controlling section configured to output a plurality of notifications by sound, under control of an information processing apparatus, wherein the information processing apparatus:
determines a state of a plurality of states of a user, wherein the state is determined based on multiple types of detection results, and
the multiple types of detection results correspond to a situation of the user;
determines a plurality of importance levels of the plurality of notifications, wherein a first importance level of the plurality of importance levels corresponds to a first notification of the plurality of notifications;
controls, based on the determined state of the user and the first importance level, the output controlling section to output the first notification by the sound;
determines a second notification of the plurality of notifications corresponding to a second importance level of the plurality of importance levels, wherein the second notification has a priority, based on the second importance level, over the first notification;
determines that an output of the second notification is permissible based on the priority of the second notification over the first notification;
suspends the output of the first notification based on the determination that the output of the second notification is permissible; and
controls the output controlling section to output, based on the suspended output of the first notification, the second notification by the sound.

14. The outputting apparatus according to claim 13, further comprising:
a plurality of sensors configured to measure sensor data corresponding to the multiple types of detection results;
a detection section configured to detect the situation of the user based on the sensor data; and
a communication section configured to transmit, to the information processing apparatus, the sensor data regarding the situation of the user.

15. An outputting method, comprising:
in an outputting apparatus:
outputting a plurality of notifications by sound, under control of an information processing apparatus, wherein the information processing apparatus performing operations comprising:
determining a state of a plurality of states of a user, wherein
the state is determined based on multiple types of detection results, and
the multiple types of detection results correspond to a situation of the user;
determining a plurality of importance levels of the plurality of notifications,
wherein a first importance level of the plurality of importance levels corresponds to a first notification of the plurality of notifications;
controlling, based on the determined state of the user and the first importance level, an output controlling section to output the first notification by the sound;
determining a second notification of the plurality of notifications corresponding to a second importance level of the plurality of importance levels,
wherein the second notification has a priority, based on the second importance level, over the first notification:
determining that an output of the second notification is permissible based on the priority of the second notification over the first notification;
suspending the output of the first notification based on the determination that the output of the second notification is permissible; and
controlling the output controlling section to output, based on the suspended output of the first notification, the second notification by the sound.

16. A non-transitory computer-readable medium having stored thereon, computer-executable instructions which, when executed by a computer, cause the computer of execute operations, the operations comprising:
outputting a plurality of notifications by sound, under control of an information processing apparatus, wherein the information processing apparatus performing operations comprising:
determining a state of a plurality of states of a user, wherein
the state is determined based on multiple types of detection results, and
the multiple types of detection results correspond to a situation of the user;
determining a plurality of importance levels of the plurality of notifications,
wherein a first importance level of the plurality of importance levels corresponds to a first notification of the plurality of notifications;
controlling, based on the determined state of the user and the first importance level, an output device to output the first notification by the sound;
determining a second notification of the plurality of notifications corresponding to a second importance level of the plurality of importance levels,
wherein the second notification has a priority, based on the second importance level, over the first notification;
determining that an output of the second notification is permissible based on the priority of the second notification over the first notification;

suspending the output of the first notification based on the determination that the output of the second notification is permissible; and controlling the output device to output, based on the suspended output of the first notification, the second notification by the sound.

17. A notification system, comprising:

an outputting apparatus; and an information processing apparatus including:

a state decision section configured to:

determine a state of a plurality of states of a user, wherein the state is determined based on multiple types of detection results, and the multiple types of detection results correspond to a situation of the user; and a control section configured to:

determine a plurality of importance levels of a plurality of notifications, wherein a first importance level of the plurality of importance levels corresponds to a first notification of the plurality of notifications;

control, based on the determined state of the user and the first importance level, the outputting apparatus to output the first notification by sound;

determine a second notification of the plurality of notifications corresponding to a second importance level of the plurality of importance levels, wherein the second notification has a priority, based on the second importance level, over the first notification;

determine that an output of the second notification is permissible based on the priority of the second notification over the first notification;

suspend the output of the first notification based on the determination that the output of the second notification is permissible; and control the outputting apparatus to output, based on the suspended output of the first notification, the second notification by the sound; and the outputting apparatus is configured to output the plurality of the notifications by the sound under control of the information processing apparatus, wherein the outputting apparatus is associated with the user.

* * * * *